US009742619B2

(12) United States Patent
Andreev et al.

(10) Patent No.: US 9,742,619 B2
(45) Date of Patent: *Aug. 22, 2017

(54) AUTOMATION OF INFORMATION TECHNOLOGY SYSTEM DEVELOPMENT

(71) Applicant: International Business Machines Corporation, Armonk, NY (US)

(72) Inventors: Dmitry Andreev, Port Chester, NY (US); Paul G. Greenstein, Croton-on-Hudson, NY (US); Galina Grunin, Briarcliff Manor, NY (US); Gregory Vilshansky, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 795 days.

This patent is subject to a terminal disclaimer.

(21) Appl. No.: 14/147,737

(22) Filed: Jan. 6, 2014

(65) Prior Publication Data
US 2014/0122686 A1 May 1, 2014

Related U.S. Application Data

(63) Continuation of application No. 11/011,449, filed on Dec. 14, 2004, now Pat. No. 8,645,513.

(51) Int. Cl.
*G06F 15/173* (2006.01)
*H04L 12/24* (2006.01)

(52) U.S. Cl.
CPC .............. *H04L 41/00* (2013.01); *H04L 41/08* (2013.01); *H04L 41/12* (2013.01); *H04L 41/22* (2013.01)

(58) Field of Classification Search
CPC ....................................................... H04L 41/00
See application file for complete search history.

(56) References Cited

U.S. PATENT DOCUMENTS

| | | | |
|---|---|---|---|
| 6,031,984 | A | 2/2000 | Walser |
| 6,041,041 | A | 3/2000 | Ramanathan et al. |
| 6,151,582 | A | 11/2000 | Huang et al. |

(Continued)

OTHER PUBLICATIONS

Chou et al; Guided simulated annealing method for optimization problems; The American Physical Society; Physical Review E 67, 066704 (2003); pp. 1-6.

(Continued)

*Primary Examiner* — Hua Fan
(74) *Attorney, Agent, or Firm* — Schmeiser, Olsen & Watts, LLP; Michael A. Petrocelli

(57) ABSTRACT

A program product and system that implements a method for adding an Information Technology (IT) structure A to an IT structure X. A first list of all dependencies of elements in a composition of X is received. It is determined that no dependency of any element E in the composition of X in the first list has an exclusion with a class Y to which A belongs. A second list of all dependencies of A is received. It is determined that no dependency of A in the second list has an exclusion with a class Z to which an element E in the composition of X belongs. It is determined that no dependency of any element E in the composition of X in the first list has an exclusion with a class Y to which A belongs and ensuring that A's dependencies are satisfied followed by adding A to X.

20 Claims, 20 Drawing Sheets

TRANSLATION OF IT STRUCTURE INSTANCE

(56) References Cited

U.S. PATENT DOCUMENTS

| | | | |
|---|---|---|---|
| 6,161,101 A | 12/2000 | Guinta et al. | |
| 6,256,773 B1 | 7/2001 | Bowman-Amuah | |
| 6,260,065 B1 | 7/2001 | Leiba et al. | |
| 6,621,505 B1* | 9/2003 | Beauchamp | G06Q 10/10 715/700 |
| 6,968,324 B1 | 11/2005 | Ruffin et al. | |
| 7,143,420 B2 | 11/2006 | Radhakrishnan | |
| 7,162,427 B1 | 1/2007 | Myrick et al. | |
| 7,222,255 B1 | 5/2007 | Claessens et al. | |
| 7,224,968 B2 | 5/2007 | Dobson et al. | |
| 7,278,134 B2* | 10/2007 | Ricke | G06N 5/00 706/50 |
| 7,313,568 B2 | 12/2007 | Cutlip et al. | |
| 7,406,534 B2 | 7/2008 | Syvänne et al. | |
| 7,437,675 B2 | 10/2008 | Casati et al. | |
| 7,523,092 B2 | 4/2009 | Andreev et al. | |
| 7,523,190 B1 | 4/2009 | Bickerstaff et al. | |
| 7,568,022 B2 | 7/2009 | Andreev et al. | |
| 7,594,016 B1 | 9/2009 | Zhou et al. | |
| 7,797,739 B2 | 9/2010 | Andreev et al. | |
| 7,886,040 B2 | 2/2011 | Andreev et al. | |
| 7,937,462 B2 | 5/2011 | Andreev et al. | |
| 8,028,334 B2 | 9/2011 | Andreev et al. | |
| 2002/0069102 A1 | 6/2002 | Vellante et al. | |
| 2002/0104071 A1 | 8/2002 | Charisius et al. | |
| 2002/0129345 A1* | 9/2002 | Tilden | G06F 9/44505 717/162 |
| 2002/0194147 A1* | 12/2002 | Ricke | G06N 5/00 706/53 |
| 2002/0198727 A1 | 12/2002 | Ann et al. | |
| 2003/0140128 A1 | 7/2003 | Cox et al. | |
| 2003/0149685 A1 | 8/2003 | Trossman et al. | |
| 2003/0158842 A1 | 8/2003 | Levy et al. | |
| 2003/0172145 A1* | 9/2003 | Nguyen | G06Q 10/10 709/223 |
| 2003/0197743 A1 | 10/2003 | Hill et al. | |
| 2004/0049295 A1 | 3/2004 | Wojsznis et al. | |
| 2004/0156391 A1 | 8/2004 | Bushnell | |
| 2004/0230464 A1* | 11/2004 | Bliss, Jr. | G06Q 10/06395 705/7.29 |
| 2004/0267679 A1 | 12/2004 | Fromherz et al. | |
| 2005/0002380 A1 | 1/2005 | Miller et al. | |
| 2005/0027858 A1 | 2/2005 | Sloth et al. | |
| 2005/0049910 A1 | 3/2005 | Lancaster et al. | |
| 2005/0066015 A1 | 3/2005 | Dandekar et al. | |
| 2005/0165922 A1 | 7/2005 | Hatano | |
| 2005/0198486 A1* | 9/2005 | Desmond | G06Q 10/10 713/1 |
| 2005/0289088 A1* | 12/2005 | Tian | G06F 8/20 706/1 |
| 2006/0031472 A1 | 2/2006 | Rajavelu et al. | |
| 2006/0041935 A1 | 2/2006 | Conley et al. | |
| 2006/0123518 A1 | 6/2006 | Olsen et al. | |
| 2006/0125847 A1 | 6/2006 | Andreev et al. | |
| 2006/0129419 A1 | 6/2006 | Flaxer et al. | |
| 2006/0129518 A1 | 6/2006 | Andreev et al. | |
| 2006/0130133 A1 | 6/2006 | Andreev et al. | |
| 2006/0156274 A1 | 7/2006 | Andreev et al. | |
| 2006/0171538 A1 | 8/2006 | Larson et al. | |
| 2006/0248501 A1 | 11/2006 | Andreev et al. | |
| 2006/0271390 A1 | 11/2006 | Rich et al. | |
| 2006/0283938 A1 | 12/2006 | Kumar et al. | |
| 2007/0083405 A1* | 4/2007 | Britt | G06F 8/20 705/70 |
| 2007/0083419 A1* | 4/2007 | Baxter | G06F 8/36 705/7.29 |
| 2007/0136676 A1 | 6/2007 | Kruempelmann et al. | |
| 2007/0289008 A1 | 12/2007 | Andreev et al. | |
| 2007/0300204 A1* | 12/2007 | Andreev | G06F 8/10 717/104 |
| 2008/0077873 A1 | 3/2008 | Peterson | |
| 2008/0183782 A1 | 7/2008 | Andreev et al. | |
| 2008/0204452 A1 | 8/2008 | Lau | |
| 2009/0031234 A1 | 1/2009 | McKay | |
| 2009/0204693 A1 | 8/2009 | Andreev et al. | |
| 2009/0287808 A1 | 11/2009 | Andreev et al. | |

OTHER PUBLICATIONS

Reliability and Availability Basics, Apr. 1, 2002, EventHelix; [online]. 5 pages. [retrieved on Dec. 5, 2007]. Retrieved from the Internet: < http://web.archive.org/web/20020401235342/www.eventhelix.com/RealtimeMantra/FaultHandling/reliability_availability_basics.htm >.

System Reliability and Availability, Apr. 1, 2002, EventHelix; [online]. 4 pages. [retrieved on Dec. 5, 2007. Retrieved from the Internet: < http://web.archive.org/web/20020401235056/www.eventhelix.com/RealtimeMantra/FaultHandling/system_reliability_availability.htm >.

What is Optimization?; [online]. 3 pages. [retrieved on Jun. 11, 2008]. Retrieved from the Internet: < htty://www-fp.mcs.anl.gov/OTC/Guide/OptWeb/opt.html >.

Office Action (Mail Date Aug. 19, 2009) for U.S. Appl. No. 11/159,918, filed Jun. 23, 2005, Confirmation No. 4650.

Office Action (Mail Date Mar. 10, 2010) for U.S. Appl. No. 11/120,678, filed May 3, 2005; Confirmation No. 3799.

Notice of Allowance (Mail Date May 18, 2010) for U.S. Appl. No. 11/135,599, filed May 23, 2005; Confirmation No. 4050.

Office Action (Mail Date May 18, 2009) for U.S. Appl. No. 11/452,181, filed Jun. 13, 2006; Confirmation No. 2623.

Office Action (Mail Date May 27, 2010) for U.S. Appl. No. 12/508,048, filed Jul. 23, 2009; Confirmation No. 7228.

Office Action (Mail Date Jun. 8, 2010) for U.S. Appl. No. 11/741,885, filed Apr. 30, 2007; Confirmation No. 3872.

Notice of Allowance (Mail Date May 23, 2011) for U.S. Appl. No. 11/120,678, filed May 3, 2005; Confirmation No. 3799.

Office Action (Mail Date Jan. 28, 2011) for U.S. Appl. No. 11/626,865, filed Jan. 25, 2007; Confirmation No. 1978.

Apr. 18, 2011 Filed Response to Office Action (Mail Date Jan. 28, 2011) for U.S. Appl. No. 11/626,865, filed Jan. 25, 2007; Confirmation No. 1978.

Final Office Action (Mail Date Oct. 7, 2010) for U.S. Appl. No. 11/159,918, filed Jun. 23, 2005; Confirmation No. 4650.

Advisory Action (Mail Date Dec. 10, 2010) for U.S. Appl. No. 11/159,918, filed Jun. 23, 2005; Confirmation No. 4650.

Jan. 3, 2011 Filed Request for Continued Examination with Preliminary Amendment for U.S. Appl. No. 11/159,918, filed Jun. 23, 2005; Confirmation No. 4650.

Notice of Allowance (Mail Date Dec. 28, 2010) for U.S. Appl. No. 11/741,885, filed Apr. 30, 2007; Confirmation No. 3872.

Notice of Allowance (Mail Date Sep. 28, 2010) for U.S. Appl. No. 12/508,048, filed Jul. 23, 2009; Confirmation No. 7228.

Office Action (Mail Date Feb. 25, 2011) for U.S. Appl. No. 12/424,698, filed Apr. 16, 2009; Confirmation No. 1059.

Office Action (Mail Date May 2, 2011) for U.S. Appl. No. 12/424,698, filed Apr. 16, 2009; Confirmation No. 1059.

Office Action (Mail Date Dec. 9, 2008) for U.S. Appl. No. 11/452,181, filed Jun. 13, 2006; Confirmation No. 2623.

Final Office Action (Mail Date May 18, 2009) for U.S. Appl. No. 11/452,181, filed Jun. 13, 2006; Confirmation No. 2623.

Advisory Action (Mail Date Nov. 9, 2009) for U.S. Appl. No. 11/452,181, filed Jun. 13, 2006; Confirmation No. 2623.

Nov. 16, 2009 Filed Notice of Appeal for U.S. Appl. No. 11/452,181, filed Jun. 13, 2006; Confirmation No. 2623.

Jan. 14, 2010 Filed Appeal Brief for U.S. Appl. No. 11/452,181, filed Jun. 13, 2006; Confirmation No. 2623.

Examiner's Answer to Appeal Brief (Mail Date Apr. 13, 2010) for U.S. Appl. No. 11/452,181, filed Jun. 13, 2006; Confirmation No. 2623.

Reply Brief Noted—BPAI (Mail Date Jun. 23, 2010) for Reply Brief Filed Jun. 14, 2010 for U.S. Appl. No. 11/452,181, filed Jun. 13, 2006; Confirmation No. 2623.

Appeal Docketing Notice (Jul. 2, 2010) for U.S. Appl. No. 11/452,181, filed Jun. 13, 2006; Confirmation No. 2623.

(56) References Cited

OTHER PUBLICATIONS

Khanna, et al., "Application Performance Management in Virtual Server Environments," Department of Electrical and Computer Engineering, Purdue University, Oct. 12, 2006, pp. 373-381. ((Mail Date Aug. 8, 2011), U.S. Appl. No. 11/626,865).
Office Action (Mail Date Aug. 8, 2011) for U.S. Appl. No. 11/626,865, filed Jan. 25, 2007; Confirmation No. 1978.
Office Action (Mail Date Sep. 9, 2010) for U.S. Appl. No. 11/120,678, filed May 3, 2005; Confirmation No. 3799.
Office Action (Mail Date Sep. 15, 2010) for U.S. Appl. No. 12/424,698, filed Apr. 16, 2009; Confirmation No. 1059.
Notice of Allowance (Mail Date Oct. 17, 2011) for U.S. Appl. No. 12/424,698, filed Apr. 16, 2009; Confirmation No. 1059.
Notice of Allowance (Mail Date Sep. 24, 2013) for U.S. Appl. No. 11/011,449, filed Apr. 16, 2009; Confirmation No. 6365.
RCE (Aug. 20, 2013) for U.S. Appl. No. 11/011,449, filed Apr. 16, 2009; Confirmation No. 6365.
Reply Brief filed (Sep. 13, 2010) for U.S. Appl. No. 11/011,449, filed Apr. 16, 2009; Confirmation No. 6365.
Examiner's Answer (Mail Date Jul. 13, 2010) for U.S. Appl. No. 11/011,449, filed Apr. 16, 2009; Confirmation No. 6365.
Appeal Brief filed (Jan. 19, 2010) for U.S. Appl. No. 11/011,449, filed Apr. 16, 2009; Confirmation No. 6365.
Appeal Brief filed (Aug. 18, 2009) for U.S. Appl. No. 11/011,449, filed Apr. 16, 2009; Confirmation No. 6365.
Appeal Brief filed (Jun. 19, 2009) for U.S. Appl. No. 11/011,449, filed Apr. 16, 2009; Confirmation No. 6365.
Appeal Brief filed (Apr. 27, 2009) for U.S. Appl. No. 11/011,449, filed Apr. 16, 2009; Confirmation No. 6365.
Notice of Appeal filed (Mar. 2, 2009) for U.S. Appl. No. 11/011,449, filed Apr. 16, 2009; Confirmation No. 6365.
Advisory Action (Mailed Feb. 13, 2009) for U.S. Appl. No. 11/011,449, filed Apr. 16, 2009; Confirmation No. 6365.
Response after final filed (Feb. 2, 2009) for U.S. Appl. No. 11/011,449, filed Apr. 16, 2009 Confirmation No. 6365.
Final Office Action (Mailed Dec. 3, 2008) for U.S. Appl. No. 11/011,449, filed Apr. 16, 2009; Confirmation No. 6365.
Response filed (Oct. 23, 2008) for U.S. Appl. No. 11/011,449, filed Apr. 16, 2009; Confirmation No. 6365.
Mail Notice of Informal Amendment (Oct. 8, 2008) for U.S. Appl. No. 11/011,449, filed Apr. 16, 2009; Confirmation No. 6365.
Response filed (Jul. 8, 2008) for U.S. Appl. No. 11/011,449, filed Apr. 16, 2009; Confirmation No. 6365.
Office Action (Mailed May 23, 2008) for U.S. Appl. No. 11/011,449, filed Apr. 16, 2009; Confirmation No. 6365.

\* cited by examiner setRelationship() Method deleteElement() Method establishInterface() METHOD

IT STRUCTURE COMPOSITION

IT DEVELOPMENT PROCESS

TRANSLATION OF IT STRUCTURE INSTANCE

TRANSLATION ITERATION PROCESS

ENSURING SPECIFICATION OF CHARACTERISTICS OF ABSTRACT IT STRUCTURE INSTANCE

ADJUSTING CHARACTERISTICS OF IT STRUCTURE INSTANCE

CLASS HIERARCHY EXAMPLE

DELIVERY BINDING

AUTOMATION OF INFORMATION TECHNOLOGY SYSTEM DEVELOPMENT

This application is a continuation application claiming priority to Ser. No. 11/011,449, filed Dec. 14, 2004, now U.S. Pat. No. 8,645,513, issued Feb. 4, 2014.

BACKGROUND OF THE INVENTION

1. Technical Field

The present invention relates to automation of Information Technology (IT) system development.

2. Related Art

A number of activities are associated with use of a computer. These activities may be grouped into several categories: development, deployment, operations and maintenance, and productive use. The category of development comprises determination of specific hardware, software, and networking required to satisfy the specific usage needs; planning of a production system.

The category of deployment comprises implementation of the developed production system, ranging from acquisition of the appropriate hardware and software to installation, configuration, and customization of acquired software, hardware and network devices, to verification of correctness of the built system.

The category of operations and maintenance comprises operation of the deployed production system and introduction of changes to it.

The category of productive use comprises application of the deployed production system to activities for which it is intended.

The preceding categories of activities are common to computing systems, be it a stand-alone personal computer, or a geographically dispersed collection of highly complex systems supporting an international corporation. The first three of the preceding categories of activities (i.e., development, deployment, operations) are a liability required in support of the last activity category of productive use of a computer system. While for a single stand-alone personal computer, development, deployment and operations may involve miniscule investment of time and/or money (with the exception of the acquisition of the necessary hardware and software), in large institutions, these preceding three activities occupy armies of technical and administrative personnel and entail high costs, primarily due to complexity of computer systems, exacerbated by constantly evolving technology and business requirements.

Thus, there is a need for a method and system to reduce costs pertaining to Information Technology (IT) development.

SUMMARY OF THE INVENTION

The present invention provides a method and associated computer program product for developing an Information Technology (IT) system, said method comprising:

providing an abstract IT structure for the system being developed;

generating a virtual IT structure from the abstract IT structure; and generating a real IT structure from the virtual IT structure.

The present invention provides a method and associated computer program product for translating an instance X of an abstract Information Technology (IT) structure of a project to a virtual IT structure, said method comprising:

translating X to an interim IT structure instance X' that is less abstract than is X; and if X' is not the virtual IT structure then repeatedly performing additional steps X until X' is the virtual IT structure or until said translating detects an error condition, said additional steps comprising setting X=X' and again performing said translating X to X'.

The present invention provides a method and associated computer program product for delivery binding a virtual Information Technology (IT) structure X into a delivery-bound virtual IT structure XDB, said method comprising:

invoking an addElement( ) method to add at least one additional IT structure A to the composition of X to form a primitive composition of XDB;

assigning a name to each element of the primitive composition of XDB; and if at least one element of the primitive composition of XDB requires access to the Internet then assigning an IP address to the at least one element of the primitive composition of XDB.

The present invention provides a method and associated computer program product for reverse-specifying at least one Information Technology (IT) structure, said method comprising:

providing information relating to an IT entity selected from the group consisting of an IT delivery environment and an IT system instance; and generating a real IT structure from the information relating to the IT entity.

The present invention provides a method and associated computer program product for adding an Information Technology (IT) structure A to an IT structure X, said method comprising:

first determining whether adding A to X violates any dependency of X and aborting if said first determining determines that adding A to X violates said any dependency of X;

second determining whether adding A to X violates any dependency of A and aborting if said second determining determines that adding A to X violates said any dependency of A; and adding A to X if said first determining and said second determining determines that adding A to X does not violates any dependency of X and A, respectively.

The present invention provides a method and associated computer program product for comparing an Information Technology (IT) structure instance X with IT structure Y, said method comprising matching elements of X and Y and/or matching relationships of X and Y, said matching elements of X and Y comprising matching the elements of a primitive composition XC of X to the elements of a primitive composition YC of Y to determine whether an element mismatch exists, wherein said element mismatch exists if at least one element of XC does not exist in YC or at least one element of YC does not exist in XC, and if said matching the elements determines that said element mismatch exists then determining any elements of XC existing in YC and any elements of YC not existing in XC; and said matching relationships of X and Y comprising matching the relationships XR of X to the relationships YR of Y to determine whether a relationship mismatch exists, wherein said relationship mismatch exists if at least one relationship of XR does not exist in Y or at least one relationship of YR does not exist in X, and if said matching the relationships determines that said relationship mismatch exists then determining any relationships of XR existing in Y and any relationships of YR not existing in X.

The present invention provides a method and associated computer program product for deleting an Information Technology (IT) structure A from an IT structure X, said method comprising:

determining a composition C of X;

generating a list of relationships R of the elements of C that involve A;

generating a list of dependencies D of the elements of C on A, excluding any dependency of A on A;

if a <force> option was selected then removing A from C; and if the <force> option was not selected and (R is not null or (D is not null and D is not null and a replacement IT structure in C satisfying each dependency in D has not been found)) then exiting without removing A from C, else removing A from C.

The present invention advantageously provides a method and system to reduce costs pertaining to Information Technology (IT) system development.

DETAILED DESCRIPTION OF THE INVENTION

The detailed description of the present invention is organized into the following sections:

1. Nomenclature;
2. Information Technology (IT) Entity Model (defines basic IT entities and describes their properties and associated processes);
3. Computer System (describes computer system used to implement an IT Entity Model and associated processes)

1. Nomenclature 1.1 Flow Charts

Figure 3:
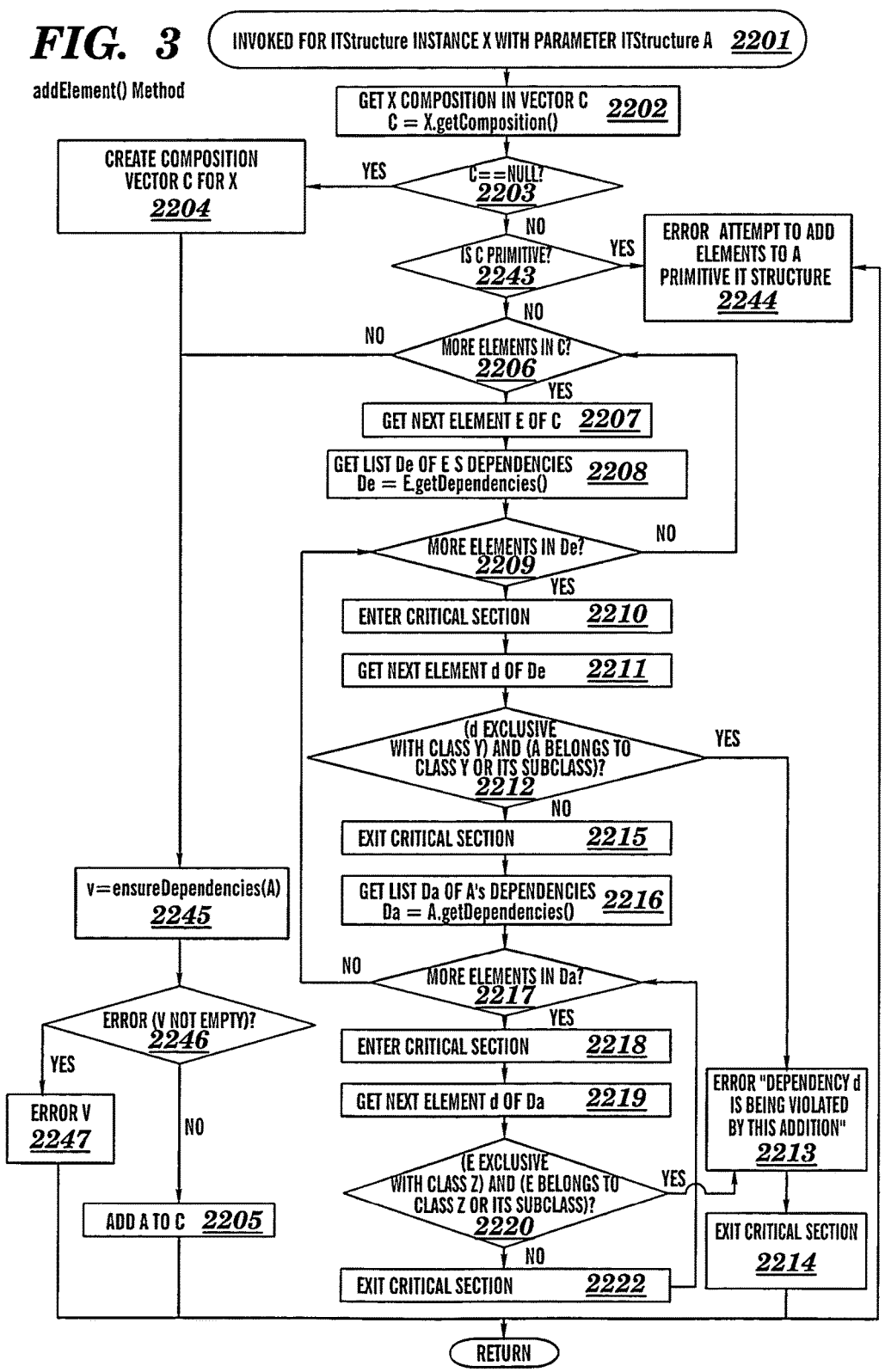
FIG. 3 is a flow chart depicting the logic of addElement( ) method, in accordance with embodiments of the present invention.

The flow charts in the Figures comprise, inter alia, the following block shapes:

1) Rectangular: represents execution of code as described (e.g., FIG. 3, block 2202); and 2) Diamond: represents a decision block (e.g., FIG. 3, block 2203).

1.2 Abbreviations

The following abbreviations are utilized herein.

CASE—computer-aided software engineering
CICS—Customer Information Control System
CPU—central processor unit
DASD—direct access storage device
DB—database
DNS—domain name server
GB—gigabyte
GUI—graphical user interface
HTTP—HyperText Transfer Protocol
HTTPS—HTTP Secure
IDE—integrated development environment
IP—internet protocol
IT—information technology
KB—kilobyte
KW—kiloWatt
LAN—local-area network
LOC—lines of code
Mbps—megabits per second
MHz—mega-Hertz
MP—multi-processor
NIC—network interface card
NOOP—no operation (moot)
OS—operating system
PM—person/month
POTS—"plain old telephone service"
RAM—random-access memory RISC—reduced instruction set computer
SL—service level
SMTP—Simple Mail Transfer Protocol
S/N—serial number
TCO—total cost of ownership
TCP/IP—transmission control protocol/internet protocol
UI—user interface
UML—universal modeling language
UP—uni-processor
UPS—uninterruptible power supply 2. Information Technology (IT) Entity Model IT systems and environments may be described in terms of IT entities. The term "entity" is understood to denote "IT entity" herein.

The base entity model comprises IT entities, relationships among the IT entities, and interfaces and methods provided by these IT entities.

For illustrative purposes, Java-like syntax is used herein as a specification language for IT structures. An IT structure is a set of IT entities. Generally, another programming language (e.g., object oriented, procedural, high- or low-level) may be used instead of Java; a modeling language (e.g., UML) may be used instead of Java; and a specialized language could be defined and implemented solely for the purpose of definition of IT structures.

2.1 IT Entities

Figure 1:
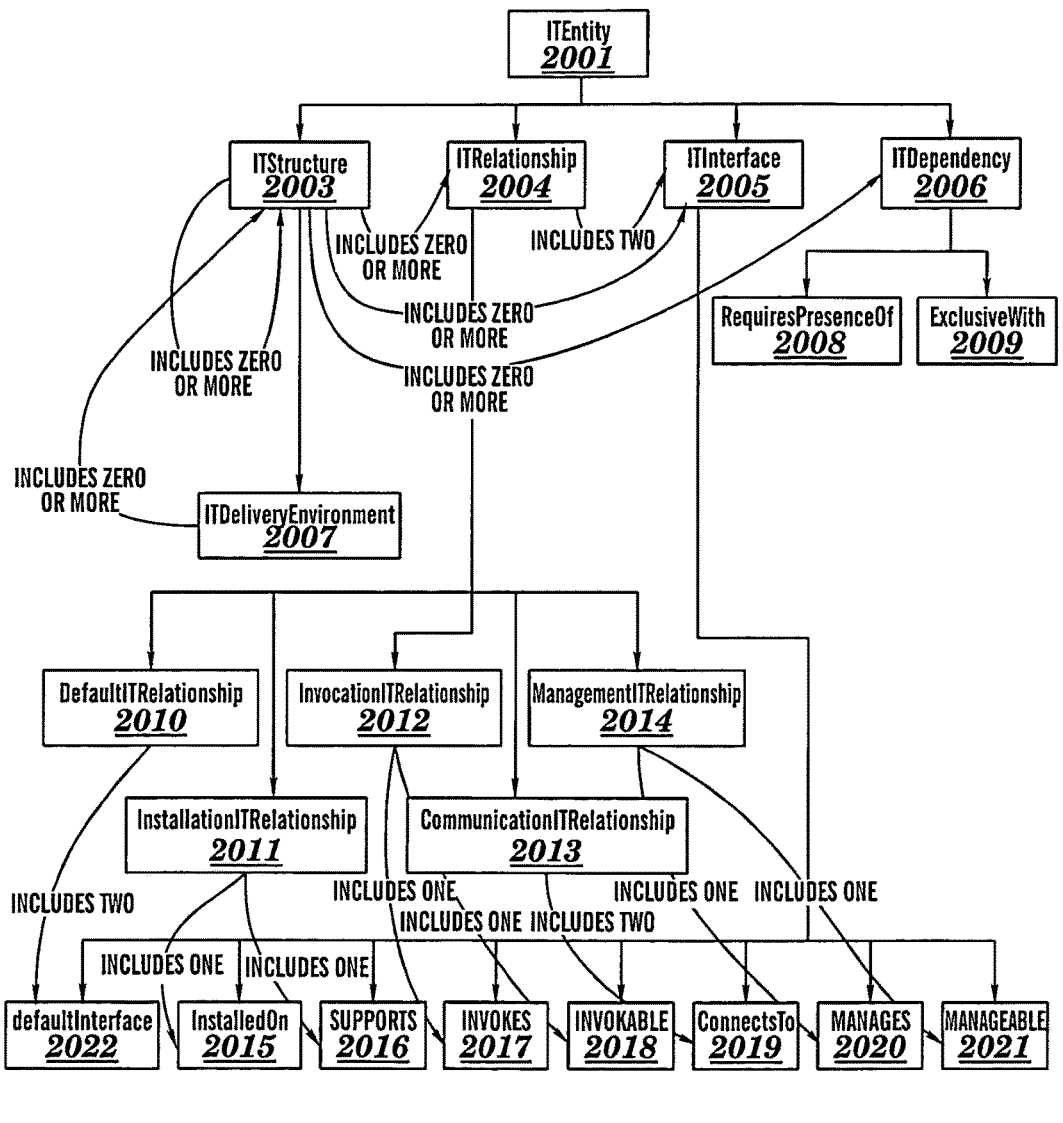
FIG. 1 is a diagram illustrating Information Technology (IT) entities included in the base entity model, and organized in a class hierarchy, in accordance with embodiments of the present invention.

FIG. 1 is a diagram illustrating IT entities included in the base entity model, and organized in a class hierarchy as shown in Table 1, in accordance with embodiments of the present invention.

TABLE 1

ITEntity 2001
    ITStructure 2003
        ITDeliveryEnvironment 2007
    ITInterface 2005
        defaultInterface 2022
        InstalledOn 2015
        Supports 2016
        Invokes 2017
        Invokable 2018
        ConnectsTo 2019
        Manages 2020
        Mangeable 2021
    ITRelationship 2004
        DefaultITRelationship 2010
        InstallationITRelationship 2011
        InvocationITRelationship 2012
        CommunicationITRelationship 2013
        ManagementITRelationship 2014
    ITDependency 2006
        RequiresPresenceOf 2008
        ExclusiveWith 2009

IT entities may be qualified as real, virtual, or abstract. A real IT entity has no undefined characteristic and may therefore be represented physically. A virtual IT entity has exactly one undefined characteristic and thus cannot have more than one undefined characteristic. An abstract IT entity has at least two undefined characteristics. Examples of real entities, virtual entities, and abstract entities will be presented infra. For convenience, class Type is introduced as follows:

Enumeration Type:=(abstract, virtual, real)

2.1.1 ITEntity Class

ITEntity class is introduced for convenience as a root class for the other IT entity classes listed above. ITEntity has the following methods:

1) constructor(String name [, Type type])—creates an instance of ITEntity with the specified name and of optionally specified type
2) boolean is Abstract( ), returns true if ITEntity is abstract, false otherwise
3) boolean is Virtual( ), returns true if ITEntity is virtual, false otherwise
4) boolean is Real( ), returns true if ITEntity is real, false otherwise
5) getName( )—returns ITEntity name
6) setType(Type type)—changes IT entity type as specified 2.2 IT Structures An IT structure is either a primitive IT structure or a complex IT structure.

A primitive IT structure is an IT entity representing materials or labor, indivisible within a particular view to a structural model, and a set of method associated with characteristics of the represented materials or labor.

A real primitive IT structure represents a specific single physical object or a specific unit of labor. Examples of real primitive IT structure include:

1) RS/6000 model F50 S/N 123456-AB. There is one and only one RS/6000 model F50 with this particular S/N.
2) Software product Ppppp version vvvvv license key 12345678-AB-9ABCD-XYZ.

A virtual primitive IT structure represents a class of specific physical objects. Examples of virtual primitive IT structure include:

1) RS/6000 model F50. Since no s/n is specified, there is a class of RS/6000 model F50 this virtual primitive IT structure corresponds to, and RS/6000 model F50 with any s/n belongs to this class.
2) Software product Ppppp version vvvvv.

An abstract primitive IT structure represents an abstract view of materials or labor. In this embodiment, abstract primitive IT structures include the same out-of-model IT entity, called abstractPrimitive. Other embodiment may have a multiplicity of abstract primitive out-of-model entities. Examples of abstract primitive IT structure include:

1) RS/6000. Since no model is specified, any RS/6000, including model F50, as well as any other models, belongs to this class.
2) Computer. Since no architecture, type, or any other characteristics are specified, any computer, including any model of RS/6000, belongs to this class.
3) Software product Ppppp.
4) Software product.

Primitive IT structures are indivisible only within a particular model. For example, a computer may be viewed as indivisible in the context of the model used in this embodiment. In a different embodiment, however, a different model may exist in which a computer may be represented as an IT structure (see discussion infra of a complex IT structure), comprising several primitive IT structures; e.g., the following collection of primitive IT structures: processor, memory, DASD, and network interface.

A complex IT structure is a non-empty collection of IT structures, a defined set of relationships (see below) among these IT structures, and a description of this IT structure's characteristics. Examples of a complex primitive IT structure include:

1) a personal computer
2) a network of Lotus Domino servers
3) a zSeries sysplex
4) a collection of programs running on a particular computer
5) a collection of software and hardware required to run Ariba Buyer application 6) a hosted application service
7) a professional service In the process of formation of an IT structure, values of properties of elements of this IT structure's composition (see below) may change; e.g., assignment of a name to a computer may be required to include that computer in an IT structure.

The set of relationships is imposed by a particular IT structure, rather than being intrinsic for the primitive IT structures comprising the IT structure. Thus, multiple complex IT structures may be created from the same set of primitive IT structures, and uniqueness of the assigned name (i.e., its inequality to any other computer name) may be imposed on a primitive IT structure representing a computer, included in a complex IT structure.

An IT structure composition is the list of IT structures included in a complex IT structure, or an out-of-model entity describing the entity represented by a primitive IT structure (e.g., a String, or a reference to a DB record).

An IT structure composition element is an IT entity included in an IT structure composition.

An abstract IT structure is an IT structure whose composition includes at least one abstract IT entity. Examples of an abstract IT structure include:

1) An abstract IT structure may include an Intel computer with a single 400 MHz Pentium processor, 1024 MB of main memory, 10 GB of DASD, and an Ethernet network interface; however, since no particular model of computer is specified, this IT structure would be abstract.

2) At a different (higher) level of abstraction, the same IT structure may include just a computer, without specification of its technology or characteristics.

A virtual IT structure is a non-abstract IT structure whose composition includes at least one virtual IT entity.

A real IT structure is a non-abstract and non-virtual IT structure.

From the above definitions, it follows that a real IT structure only includes real IT entities in its composition. From the above definitions, it also follows that in a real IT structure, each IT entity in its composition uniquely corresponds to a physical IT entity.

Table 2 infra provides examples of IT structure composition.

TABLE 2

Examples of IT structure composition

| IT structure | Networking | Computers | Software | Labor |
|---|---|---|---|---|
| Abstract IT structure with high degree of abstraction | network | computer | Ariba Buyer application | |
| Abstract IT structure with low degree of abstraction | TCP/IP network | platform | Ariba Buyer Application v7 | |
| Virtual IT structure | connectivity requirements | platform and associated parameters (memory, processor power, DASD space) | Ariba Buyer v7 for AIX on RS/6000 | installation and management |
| Delivery-bound IT structure | LAN segments with symbolic IP addresses | model | Ariba Buyer v7.02 for AIX on RS/6000 | specific installation activities; specific management activities |
| Real IT structure | LAN segments with real IP addresses | computer s/n specified | Ariba Buyer v7.02 for AIX on RS/6000, license # <lic. #> | skill level and quantity of labor by activity specified |

An IT structure primitive composition is the list of primitive IT structures included in an IT structure, where all complex IT structures are replaced with their respective primitive compositions.

Figure 8:
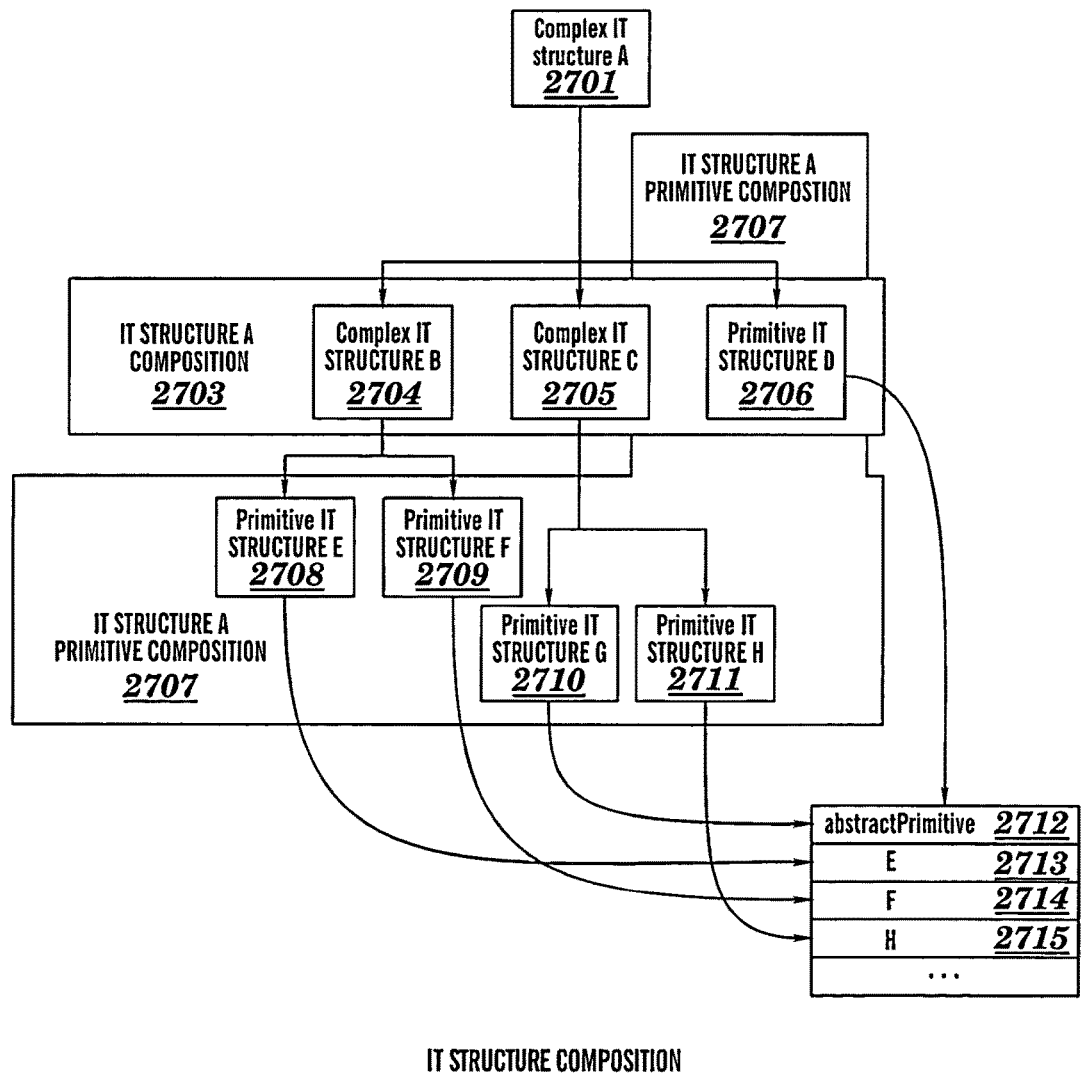
FIG. 8 is a diagram illustrating the concept of IT structure composition, in accordance with embodiments of the present invention.

FIG. 8 is a diagram illustrating the concept of IT structure composition, in accordance with embodiments of the present invention. A complex IT structure A 2701 includes in its composition 2703 two other complex IT structures B 2704 and C 2705, and one abstract primitive IT structure D 2706. Complex IT structure B includes in its composition two primitive IT structures E 2708 and F 2709, and complex IT structure C includes in its composition two primitive IT structures, an abstract primitive IT structure G 2710, and a primitive IT structure H 2711. Both abstract primitive IT structures, D and H, represent the abstractPrimitive out-of-model entity 2712, while all other primitive IT structures represent respective non-abstract out-of-model entities 2713, 2714, 2715. The IT structure A primitive composition 2707 includes all primitive IT structures shown (and no complex IT structures), namely primitive IT structures E 2708, F 2709, G 2710, H 2711, and D 2706.

An abstract IT structure with a high level of abstraction may be "an Ariba Buyer application running on a computer, connected to a network". The degree of abstraction can be lowered by restating the previous clause in more specific terms—"an Ariba Buyer application running on an RS/6000 computer, connected to a TCP/IP network".

The corresponding virtual IT structure may be "an Ariba Buyer version 7.0 for AIX on RS/6000 application, running on an AIX v5.0 operating system and RS/6000 model F50 computer with one 320 MHz CPU, 640 KB of main memory, and 128 GB of DASD in a single disk, connected through a 10 Gbps Ethernet LAN to a TCP/IP network—and—labor associated with installation and management of the above".

Once resolved into a delivery-bound IT structure, the previous IT structure may turn into something like "an Ariba Buyer version 7.0 path level 17.2 for AIX on RS/6000 application, running on an AIX v5.0 patch level 5.0.3.2 operating system and RS/6000 model F50-3745 computer with one 320 MHz CPU, 640 KB of main memory, 128 GB of DASD in a single disk, and a NIC (network interface card), connected through a 10 Gbps Ethernet LAN to a TCP/IP network on a single segment with a symbolic IP address of a.b.c.d and specific installation and management activities associated with the above.

Once deployed in a data center, the corresponding real IT structure would be "an Ariba Buyer version 7.0 path level 17.2 for AIX on RS/6000 application, license #178215-04, running on an AIX v5.0 patch level 5.0.3.2 operating system, license #514ABC-AE, and RS/6000 model F50-3745 computer, s/n 6734-FWU, with one 320 MHz CPU, 640 KB of main memory, 128 GB of DASD in a single disk, and a NIC (network interface card), connected through a 10 Gbps Ethernet LAN to a TCP/IP network on a single segment with a symbolic IP address of a.b.c.d and specific installation and management activities associated with the above, including quantity of labor and level of skills for each.

A delivery-bound IT structure is a virtual IT structure ready for provisioning in a particular delivery environment (see below) with no additional input/sources of information. "In a particular delivery environment" means "at the level of detail required by the provisioning process of the delivery environment". For example, a delivery-bound IT structure may include a specification of 10/100 Mbps Ethernet card, without regard to the manufacturer of that card.

An operating IT structure instance is a collection of physical hardware, software, networking, and labor, resulting from deployment of a real IT structure.

2.2.1 ITStructure Class

An IT Structure is represented by a class ITStructure, which inherits from ITEntity class and has the following methods:

1) ITStructure(String name, String function, Vector functions, Vector operationalCharacteristics)—constructor
Note: Type is not specified for an ITStructure class—it is always derived based on ITStructure composition using the type definition as a rule.
2) Vector getFunctions( )—returns a list of functions (String) supported by ITStructure (always non-null)
3) Vector setFunctions(Vector V)—adjusts IT structure for support of one or more functions whose names were previously returned by getFunction( ) method; the list V is a list of pairs (<function>,<value>), where <function> is one of the list returned by getFunction( ) method and <value> is the associated setting. The method returns an empty Vector if the method execution was successful, and a list of error messages otherwise. If an error occurs, the method has not altered the IT structure.
4) Vector getOperationalCharacteristics( )—returns a list of pairs of names (String) and values (String) of operational characteristics of this IT structure
5) Vector setOperationalCharacteristics(Vector V)—adjusts IT structure operational characteristics as specified by the input parameters. The input parameter is a list of pairs of (operational characteristic name (String), characteristic value), where operational characteristic name is one of the values returned by the getOperaitonalCharacteristics( ) method, and characteristic value is specific to the operational characteristic being modified. The list V corresponds to all of or a subset of the list returned by getOperationalCharacteristics( ) method. The method returns an empty Vector if the method execution was successful, and a list of error messages otherwise. If an error occurs, the method has not altered the IT structure.
6) Vector getResolutionValues( )—returns a list of pairs of names (String) and values (String) of abstraction resolution parameters of this IT structure
7) JavaClass resolve(Vector V), where V is Vector of pairs (String resolution_parameter, value)—returns a less abstract ITStructure instance, instantiated with the specified resolution parameters if execution was successful; returns a Vector of error messages if no resolution was possible (in which case the IT structure is left unmodified)
8) boolean is Primitive( )—returns true if this IT structure is primitive
9) boolean is Complex( )—returns true if this IT structure is complex
10) Vector getComposition( )—for a complex IT structure, returns list of other IT structures comprising this IT structure; for a primitive IT structure, returns the list including the IT structure itself.
11) Vector getPrimitiveComposition( )—returns primitive composition of an IT; returns the IT structure itself if invoked for a primitive IT structure.
12) Vector getInterfaces( )—returns the list of IT interfaces this IT structure possesses
13) Vector getRelationships( )—returns a list of IT relationships elements of this IT structure's composition are involved in; returns an empty Vector if no IT relationships exist among elements of this IT structure's composition.
14) Vector getPrimitiveRelationships( )—returns a list of IT relationships elements of this IT structure's primitive composition are involved in; returns an empty Vector if no IT relationships exist among elements of primitive composition of this IT structure.
15) ITRelationship getRelationship(ITStructure A, ITStructure B)—returns the ITRelationship instance for relationship of IT structures A and B within the composition of this IT structure or null if IT structures A and B are not involved in an IT relationship
16) Vector setRelationship(ITStructure x, ITInterface xi, ITStructure y, ITInterface yi, Relationship r)—establishes the relationship r between IT structures x and y within the composition of this IT structure. Returns a null Vector if relationship was established successfully, and a Vector of error messages if relationship could not be established.
17) Vector setDependency({<add>|<remove>}, ITDependency x)—adds or removes the specified IT dependency to or from this IT structure. Returns a null Vector if dependency was added or removed successfully, and a Vector of error messages if dependency could not be added. Removal of an IT dependency is always successful. Addition of an IT dependency may fail if x contradicts an existing dependency—e.g., x indicates mutual exclusivity with IT structure Y and a dependency on presence of Y is already stated.
18) Vector getDependencies( )—returns a list of IT dependencies of this IT structure.
19) Vector addElement(ITStructure A)—adds IT structure A to the composition of this IT structure. Returns a null Vector if addition was successful, and a Vector of error messages if addition failed. In order to ensure uniqueness of identifiers (computer names, network addresses) within IT structures, each identifier within IT structure A being added is prefixed with string A.getName( )+".". As a part of the addition process, addElement( ) method verifies that:
  a. addition of IT structure A to the composition of this IT structure does not violate any IT dependencies for any IT structure already included in the composition of this IT structure
  b. addition of IT structure A to the composition of this IT structure does not violate any IT dependencies for IT structure A and ensures that IT dependencies of the IT structure being added are satisfied. Each added IT structure composition element's name is prefixed with the IT structure name to ensure uniqueness.

20) Vector ensureDependencies(ITStructure A)—ensures that IT dependencies of the class requiresPresenceOf of ITStructure A in the composition of this IT structure are satisfied. If processing is unsuccessful, a Vector of error message(s) is returned, otherwise, a null Vector is returned.

21) Vector deleteElement(ITStructure A [, <force>])—removes IT structure A from the composition of this IT structure. Returns a null Vector if removal was successful, and a Vector of error messages if removal failed. <force> indicates that A should be removed regardless of relationships with or dependencies on it by other elements of this IT structure's composition.

22) Vector setOptimizationFunctions(Vector F)—specifies a prioritized list (starting with the highest priority and ending with the lowest) of optimization classes (see Optimization) to be applied to this IT structure. Returns a null Vector if processing is successful, and a Vector of error messages otherwise.

23) Vector getOptimizationFunctions( )—returns the prioritized list of optimization classes to be applied to this IT structure.

24) Vector optimize( )—performs optimization of the IT structure using the specified prioritized list of optimization classes and applying each optimization function to the IT structure in turn, starting with the highest and ending with the lowest priority of optimization classes. Returns a Vector, containing the optimized IT structure as its first element if optimization was successful, and a list of error messages otherwise.

25) Vector setTargetITDeliveryEnvironments(Vector D)—specifies a list of target IT delivery environments (see below) for this IT structure. Returns a list of error messages if an error occurs (e.g., invalid specification of a target IT delivery environment), and a null Vector otherwise.

26) Vector getTargetITDeliveryEnvironments( )—returns the list of target IT delivery environments for this IT structure.

27) getID( )—returns a real IT structure's unique identifier; returns null if invoked for a non-real IT structure.

28) setID( )—sets real IT structure unique identifier; NOOP for a non-real IT structure.

29) Vector SLmaintenance(Vector V)—optional, supported for Autonomic IT System Improvement Cycle (see below); obtains a list of pairs of operational characteristics and associated values provided by monitoring facilities, and performs adjustment of the operational characteristics to sustain the SL. Returns a null Vector if processing is successful and a list of error messages if processing is unsuccessful.

2.2.2 Detailed Description of Non-Trivial Methods
2.2.2.1 Setfunctions

A composition of an IT structure instance and relationships among elements of its composition may depend on particular function(s) this IT structure instance is intended to perform. The purpose of this method is to perform the necessary adjustments within IT structure instance that tailor IT structure composition and relationships among composition's elements as appropriate. This method also performs enforcement of function-specific rules.

The setFunctions( ) method is subclass-specific. Class ITStructure includes a placeholder that does nothing other than store the specified business function. ITStructure examples include:

1) IT structure X has three functions—A, B, C. However, these functions cannot be fulfilled indiscriminately (by their nature)—either A, or B and/or C, but not A and B, A and C, or A, B, and C can be supported by any instance of IT structure X. The setFunctions( ) method, when invoked, would ensure proper combination of functions requested from the instance of X, and prohibit improper modifications in the future.

2) Composition of instance of X may depend on the functions it performs. To perform function A, X may need to include an Intel server running Windows OS, an Oracle DB and a specific program package supporting function A. To perform functions B or C, X may need to include an RS/6000 server (whose power depends on whether only one of functions B and C, or both of these functions are supported), with a DB2 DB and specific program packages supporting functions B or C. So, the composition of X will be altered by the setFunctions( ) method appropriately, based on specification of functions.

2.2.2.2 Setoperationalcharacteristics

A composition of an IT structure instance and relationships among elements of its composition, given a particular set of functions supported by the IT structure instance, may depend on operational characteristics associated with support of particular functions. The purpose of this method is to perform the necessary adjustments within IT structure instance that tailor IT structure composition and relationships among composition's elements as appropriate. This method also performs enforcement of operational-characteristic-specific rules.

The setOperationalCharacteristics( ) method is subclass-specific. Class ITStructure includes a placeholder that does nothing other than store the specified operational characteristic values.

EXAMPLES

1) IT structure X function A potentially supports up to 500 users. Its response time depends on the power and amount of memory of the processor that runs function A and an increment in the number of supported users can be translated into a processor power and memory increments. An instance of X is created, whose requirement is to support up to 200 users. setOperationalCharacteristics(new Vector("users", 200)) can be used to specify that number and adjust the configuration of the Intel server supporting function A in the composition of instance of X to ensure it supports the required number of users.

2) Availability of IT structure X instance supporting function A may be 80% or 99.8%, depending on configuration of processors and software supporting function A. If a single set of hardware and software elements support function A, availability is 80%; if supporting hardware and software are duplicated and appropriate monitoring software is added to permit takeover between the two sets of hardware and software, availability is 99.8%. setOperationalCharacteristics(new Vector("availability", "high")) can be used to indicate that instance of X when supporting function A must provide 99.8% availability.

3) The above operational characteristics settings may be combined: setOperationalCharacteristics(new Vector(("users", 200), ("availability", "high")))

2.2.2.3 Resolve

A composition of an IT structure instance and relationships among elements of its composition, given a particular set of functions supported by the IT structure instance and given a particular set of operational characteristics associated with support of the particular set of functions, may depend on additional factors. A purpose of this method is to perform the necessary adjustments within IT structure instance that tailor IT structure composition and relationships among composition's elements as appropriate.

The resolve( ) method is subclass-specific. Class ITStructure includes a placeholder that does nothing other than store the specified resolution values.

Example: Two hardware and operating systems platforms exist that provide equivalent (both in terms of scale and cost) performance, permitting an instance of IT structure X to support the required number of users with equivalent operational characteristics for its function A. For example, the choice of either of the two hardware and operating system platforms for the composition of an instance of IT structure X providing function A will produce an equivalent result. Further, the delivery environment in which the instance of X will operate, support both combinations of hardware and operating system with equivalent costs and service levels. The resolve( ) method may be used to specify which of the two combinations of hardware and operating system platforms to use based on other factors. For example, IT developer's preference or similarity with hardware and operating system platforms of other IT structures involved in a solution.

Assume the two combinations of hardware and operating system platforms are (a) AIX on RS/6000 and (b) Linux on Intel. So, IT structure X may provide a resolution characteristic "platform preference" which may be specified as "AIX" or "Linux", resulting in the choice of (a) or (b) for the instance of IT structure X.

2.2.2.4 Setrelationship

Once an IT structure is added to the composition of the IT structure being developed, the developer may specify IT relationships between the added IT structure and other elements of the composition or primitive composition of the IT structure being developed.

Figure 2:
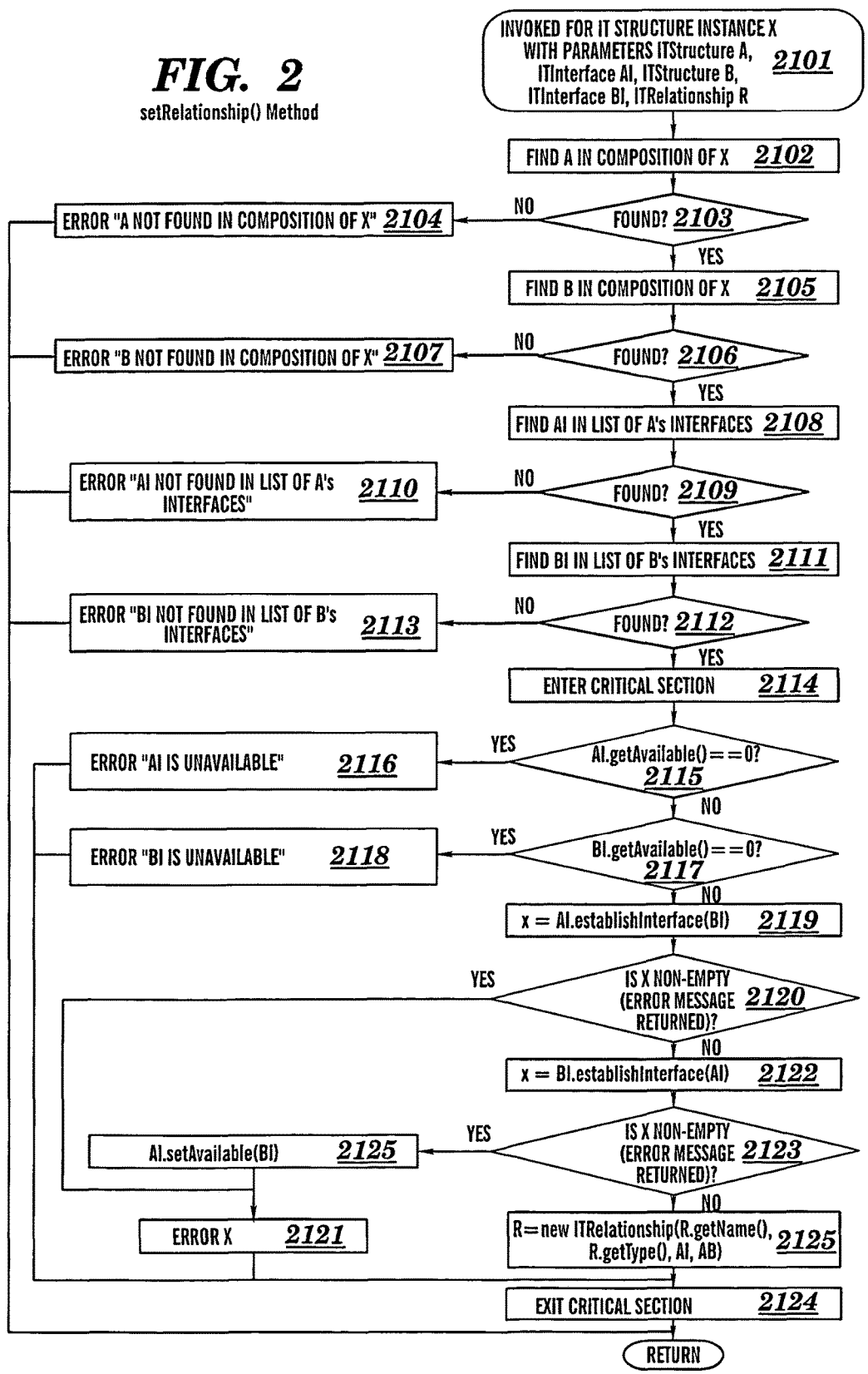
FIG. 2 is a flow chart depicting the logic of setRelationship( ) method, in accordance with embodiments of the present invention.

FIG. 2 is a flow chart depicting the logic of setRelationship( ) method, in accordance with embodiments of the present invention. The Vector setRelationship(ITStructure x, ITInterface xi, ITStructure y, ITInterface yi, Relationship r) establishes the relationship r between IT structures x and y within the composition of this IT structure. The setRelationship( ) method returns a null Vector if relationship was established successfully, and a Vector of error messages if relationship could not be established. The setRelationship( ) method for ITStructure instance X is invoked with parameters ITStructure A, ITInterface AI, ITStructure B, ITInterface BI, ITRelationship R 2101. The method attempts to find IT structure A in the composition of X 2102. If IT structure A is not found in the composition of X 2103, an error message is returned 2104 and processing terminates. The method then attempts to find IT structure B in the composition of X 2105. If IT structure B is not found in the composition of X 2106, an error message is returned 2107 and processing terminates. The method then proceeds to finding IT interface AI in the list of IT interfaces of IT structure instance A 2108. If AI is not found 2109, an error message is returned 2110 and processing terminates. The method then attempts to find IT interface BI in the list of IT interfaces of IT structure instance B 2111. If BI is not found 2112, an error message is returned 2113 and processing terminates.

Upon ascertaining presence of both specified IT structure instances A and B and IT interfaces AI and BI within A and B, the method execution enters a critical section 2114 which is used to serialize updates to the IT interface states. A critical section is a portion of the method which cannot be executed concurrently in a multi-threaded fashion, and entry to which must be serialized. No particular method of serialization for critical sections of programs is prescribed by this embodiment—known methods include (but are not limited to) semaphores, process queues, process locks, TS (Test and Set) instruction, CS (Compare and Swap) instruction.

The method then checks availability of IT interface AI by invoking the getAvailable( ) method of IT interface AI; if AI is unavailable 2115, an error message is returned 2116, previously entered critical section is exited 2124, and processing terminates. The method proceeds to checking availability of IT interface BI by invoking the getAvailable( ) method of IT interface BI; if BI is unavailable 2117, an error message is returned 2118, previously entered critical section is exited 2124, and processing terminates.

Upon ascertaining availability of both AI and BI interfaces, the method attempts to relate IT interfaces AI and BI. Vector x is allocated (not shown in the figure) to contain error message strings from attempts to establish the interface between AI and BI. The method attempts to update IT interface AI as interfacing with IT interface BI by invoking AI method establishInterface(BI), passing it BI as the parameter 2119. If an error occurs during the establishInterface(BI) method of AI invocation 2120, Vector x contains error messages, which are returned to the invoker of setRelationship( ) method of IT structure instance X 2121 upon exiting the critical section 2124. The method then attempts to update IT interface BI as interfacing with IT interface AI by invoking BI method establishInterface(AI), passing it AI as the parameter 2122. If an error occurs during the establishInterface(BI) method of AI invocation 2123, Vector x contains error messages, which are returned to the invoker of setRelationship( ) method of IT structure instance X 2121 upon exiting the critical section 2124, but only after the error cleanup is performed and the previously established update of IT interface AI is reversed by invoking its method setAvailable(BI) 2125.

If interface establishment was successful, IT relationship R is updated to contain the interface AI and BI 2125 prior to completion of method execution.

2.2.2.5 Addelement

FIG. 3 is a flow chart depicting the logic of addElement( ) method, in accordance with embodiments of the present invention. The Vector addElement(ITStructure A) method adds IT structure A to the composition of IT structure X. The IT structures A and X may each independently be an abstract IT structure, a virtual IT structure, or a real IT structure. However, the resulting IT structure will have the highest degree of abstraction of that of X and A. For example, if X is abstract the result will be abstract even if A is not abstract, and if A is abstract the result will be abstract even if X is not abstract. As another example, if either X or A is virtual, and both X and A are not abstract, the result will be virtual.

The addElement( ) method returns a null Vector if addition was successful, and a Vector of error messages if addition failed. The addElement( ) method of ITStructure instance X is invoked with parameter ITStructure A, referencing the ITStructure instance to be added to X's composition 2201. The method retrieves composition of X as a Vector C 2202. If C is null (there are no composition elements for X) 2203, this is the addition of the first element, and no additional checks are necessary. The method creates a composition Vector C for X 2204, adds ITStructure A to C 2205, and returns.

If ITStructure X is a primitive IT structure (X.isPrimitive( )==true) 2243, an error message is stored 2244 and processing terminates.

If ITStructure X already has non-empty composition 2203, the method iterates through X's composition elements making sure no IT dependencies of either X or A are violated by the addition of A to X. While there are elements in C 2206, the next unprocessed element E of C is obtained 2207, and its list of IT dependencies De is extracted using the getDependencies( ) method of E 2208.

While there are unprocessed elements in De (list of IT dependencies of ITStructure E) 2209, the following is performed. A critical section is entered 2210. The next element d of De is obtained 2211. If d (which belongs to the class ITDependency) indicates exclusion with class Y and IT structure A belongs to class Y or its subclass 2212, an error message is stored 2213, and upon exiting from the critical section 2214, processing terminates. Otherwise, critical section is exited 2215.

The method execution then proceeds to obtaining the list Da of IT dependencies of A using the getDependencies( ) method of A 2216. While there are unprocessed elements in Da (list of IT dependencies of ITStructure A) 2217, the following is performed. A critical section is entered 2218. The next element d of Da is obtained 2219. If d (which belongs to the class ITDependency) indicates exclusion with class Z and IT structure E belongs to class Z or its subclass 2220, an error message is stored 2213, and upon exiting from the critical section 2214, processing terminates. Otherwise, critical section is exited 2222.

When all possible combinations of potential dependencies of IT structure A and all elements of the composition of X are exhausted, and no violation has been found, the addElement( ) method invokes method ensureDependencies(A) 2245 to ensure that any of A's IT dependencies of the class requiresPresenceOf are satisfied. If ensureDependencies( ) method's processing was not successful 2246, any error messages returned by the ensureDependencies( ) method's invocation are returned, otherwise, A is added to the composition A is added to the composition C of IT structure X 2205.

2.2.2.6 Ensuredependencies

Figure 7:
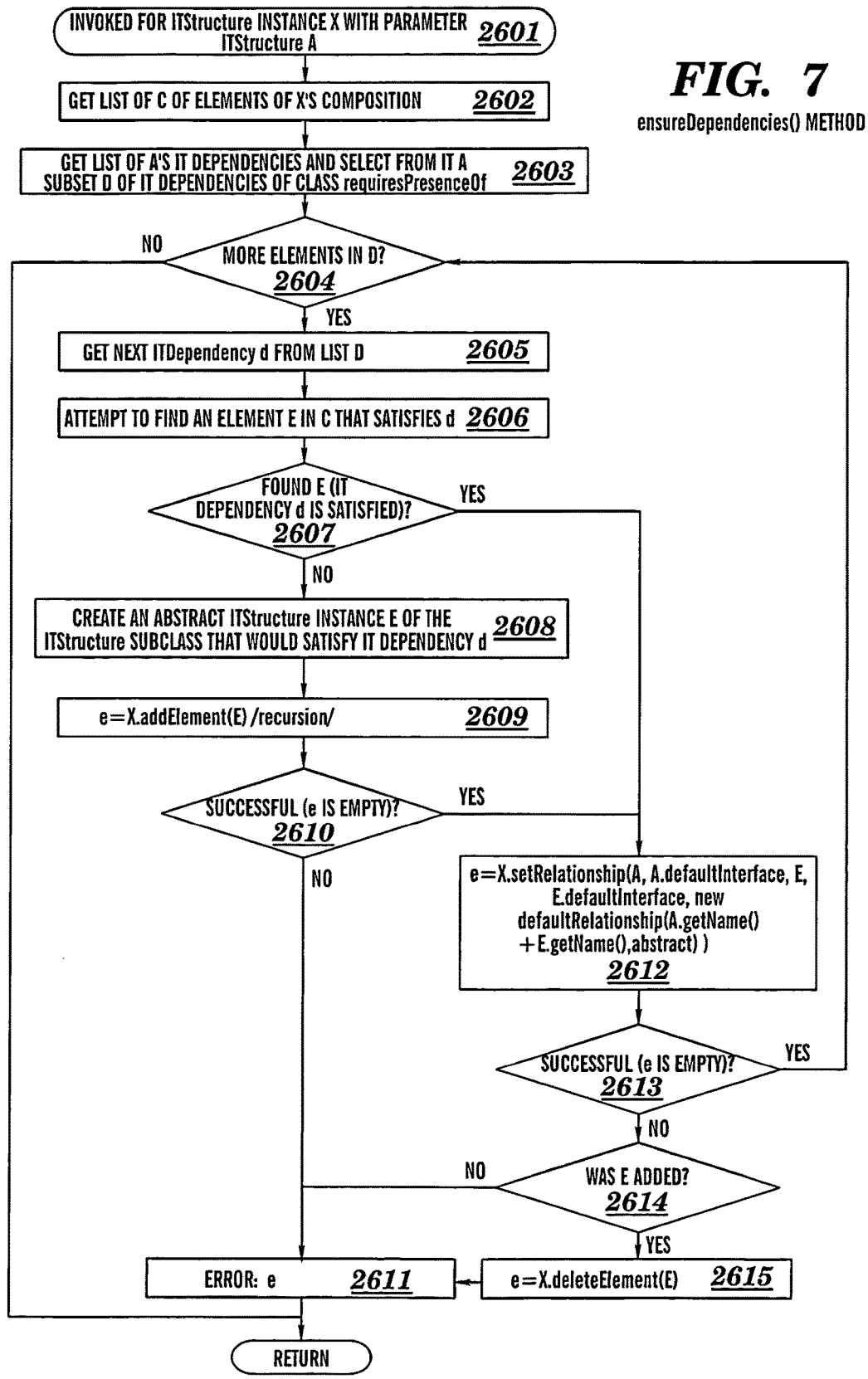
FIG. 7 is a flow chart depicting the logic of ensureDependencies( ) method, in accordance with embodiments of the present invention.

FIG. 7 is a flow chart depicting the logic of ensureDependencies( ) method, in accordance with embodiments of the present invention. The ensureDependencies(ITStructure A) method ensures that IT dependencies of the class requiresPresenceOf of ITStructure A in the composition of this IT structure are satisfied. If processing is unsuccessful, a Vector of error message(s) is returned, otherwise, a null Vector is returned. The ensureDependencies( ) method is invoked for IT structure instance X with parameter ITStructure A 2601. The method retrieves composition of X as Vector C 2602 and the list of A's IT dependencies, from which it selects a subset (list D) of IT dependencies of class requiresPresenceOf 2603. The method then iterates through list D of IT dependencies of class requiresPresenceOf of IT structure A, until the end of the list is reached 2604. Each element d of list D is an IT dependency d of class requiresPresenceOf. The method retrieves the next element d from the list 2605 and attempts to find an element of C (IT structure X composition) that satisfies the IT dependency d 2606. If an element E of C satisfying IT dependency d is found 2607, IT dependency d is considered to be satisfied.

ensureDependencies( ) method then creates an abstract IT structure E of ITStructure subclass that satisfies IT dependency d 2608 and attempts to add E to the composition of IT structure X using a recursive invocation of X.addElement(E) 2609. If execution of X.addElement(E) failed (i.e., E could not be added to X's composition—e.g., because it is exclusive with some element of X's composition) 2610, any error messages returned by X.addElement(E) are returned 2611 and processing terminates. Otherwise, addition of E to X's composition was successful, IT dependency d is now considered to be satisfied.

An abstract IT relationship (defaultRelationship) between E (either found in the composition C of IT structure X, or newly created) and A using defaultInterface of both is created and added to IT structure X) 2612. If establishment of the IT relationship was unsuccessful 2613, error message(s) are returned to the invoker 2611. If E was newly added 2614, it is removed 2615 to maintain the composition of IT structure X unchanged.

If establishment of the new IT relationship was successful 2613, the next element d of A's dependencies is considered.

2.2.2.7 Deleteelement

Figure 4:
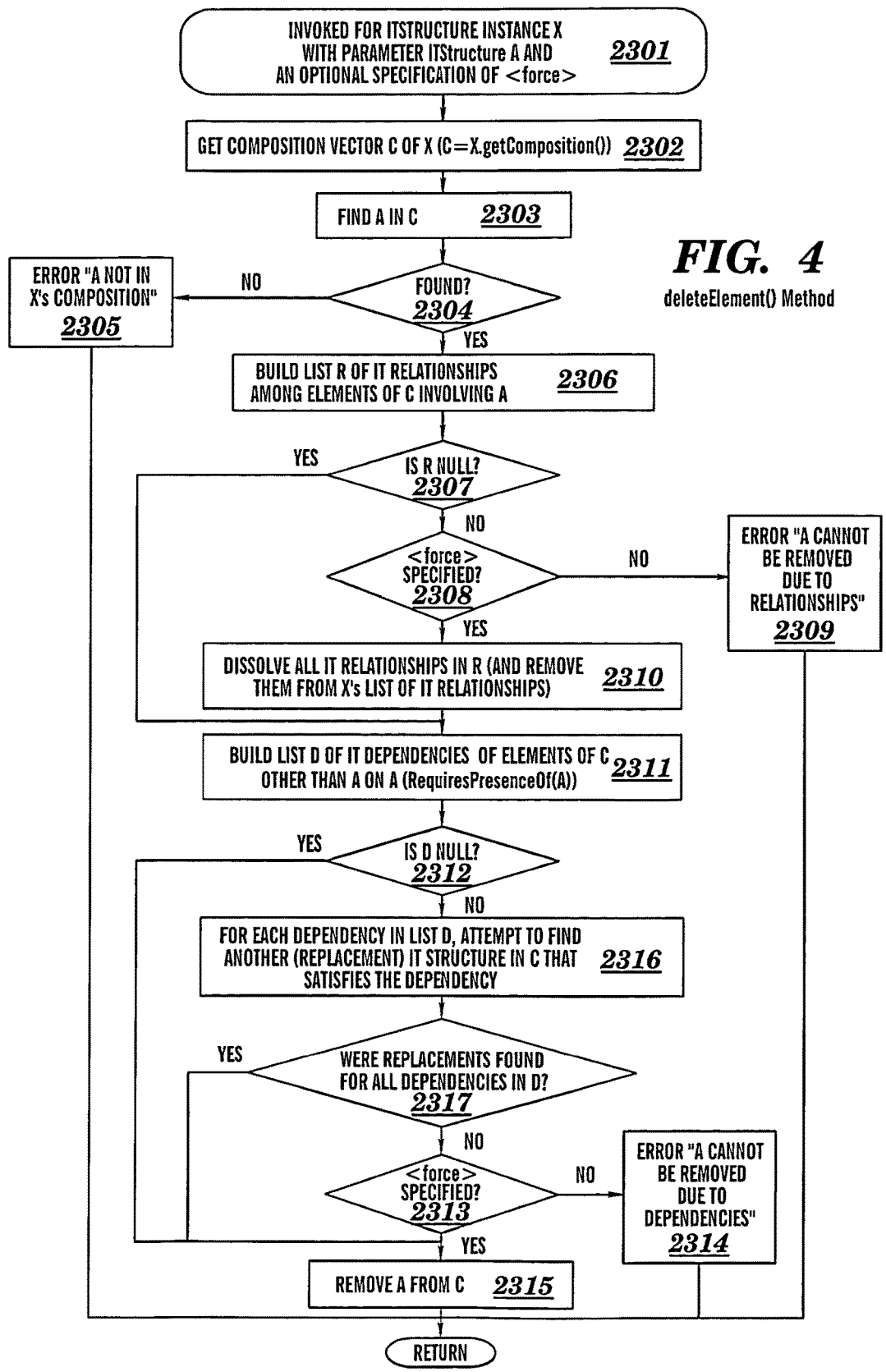
FIG. 4 is a flow chart depicting the logic of deleteElement( ) method, in accordance with embodiments of the present invention.

FIG. 4 is a flow chart depicting the logic of deleteElement( ) method, in accordance with embodiments of the present invention. The deleteElement(ITStructure A [, <force>]) method removes IT structure A from the composition of this IT structure. Returns a null Vector if removal was successful, and a Vector of error messages if removal failed. <force> indicates that A should be removed regardless of relationships with or dependencies on it by other elements of this IT structure's composition. In a first embodiment the <force> option is available for being selected, and in a second embodiment the <force> option is not available for being selected. Thus, the <force> option may not be specified because: (1) the <force> option is not available for being selected or (2) the <force> option is available for being selected but was not selected. The deleteElement( ) method is invoked for IT structure instance X with parameter ITStructure A and an optional specification of <force> 2301. The method retrieves composition of X as Vector C 2302 and attempts to find IT structure A in C 2303. If A is not found in C 2304, an error message is stored 2305 and processing terminates. Otherwise, the method proceeds through the attempt to remove A from C.

The method builds the list R of IT relationships of elements of C that involve A 2306. If R is not null (i.e., A is involved in IT relationships with at least one other element of composition of X) 2307, the method checks whether the <force> option was specified 2308, and if not, A cannot be removed from the composition of X, an error message is stored 2309, and processing terminates. If, however, <force> was specified, the method removes all IT relationships in the list R and removes them from the list of IT relationships of elements of C 2310.

The method then proceeds to check IT dependencies involving A. The method builds a list D of all dependencies of elements of C other than A itself on A 2311. If the list D is not null 2312, for each dependency in list D, the method attempts to find an element in C other than A that would satisfy the dependency 2316. If replacements were not found for any dependencies in list D 2317, the method checks whether the <force> option was specified 2313, and if not, A cannot be removed from the composition of X, an error message is stored 2314, and processing terminates.

Otherwise, if all previous checks indicate that removal of A will not damage IT structure X, or if the <force> option specification overrides the possible damage, the method removes A from C 2315.

2.3 IT Interfaces

An IT Interface is a characteristic of an IT structure, specifying a type of relationship this IT structure can engage in relative to other IT structures.

An abstract IT interface instance is an IT interface instance involving at least one abstract IT structure.

A virtual IT interface instance is a non-abstract IT interface instance involving at least one virtual IT structure.

A real IT interface instance is an IT interface instance involving only real IT structures.

A multi-connection IT interface is an IT interface to which multiple IT structures can relate (connect). For example, multiple invokers can call a single program—sometimes, concurrently.

A single-connection IT interface is an IT interface to which a single IT structure can relate (connect). For example, only a single cable can be plugged into a single printer port of a personal computer.

An available IT interface is an IT interface to which one or more IT structures can relate (connect).

A busy or Unavailable IT interface is an IT interface which has exhausted its ability to relate, and cannot be involved in any additional relationships (i.e., the maximum number of relationships have already been established). For example, a printer port of a personal computer is available if nothing is connected to it, and busy/unavailable if a printer cable is plugged into it.

2.3.1 ITInterface Class

An ITInterface class inherits from ITEntity class and has the following methods:

1) ITInterface(String name, Type type)—constructor, creates an ITInterface instance with specified name and type
2) boolean is SingleConnection( )—returns true if this ITInterface is a single-connection IT interface, and false otherwise
3) boolean is Available([int p])—returns true if ITInterface is available, false otherwise; optional parameter p indicates the specific connection for a multi-connection interface
4) setAvailable([ITInterface i])—makes ITInterface available; an ITInterface parameter i may be specified for multi-connection IT interfaces to indicate which of the multiple connections is to be made available
5) Vector establishInterface(ITInterface i [, int p])—establishes an interface with the parameter IT interface; returns an empty Vector if interface was established successfully, and a list of error messages otherwise. For a multiple-connection IT interface, may be optionally provided with the second parameter p specifying the connection.
6) int getAvailable( )—for multi-connection IT interfaces returns the number of available connections; always returns zero (unavailable) or one (available) for single-connection IT interfaces; always returns "high integer" for multi-connection IT interfaces with unlimited number of connections
7) int getRelated( )—returns the number of ITInterface instances related to this ITInterface
8) Vector getRelatedITInterfaces( )—returns a list of zero or more ITInterface instances related to this ITInterface
9) Vector verifyValidity(ITInterface Y)—returns null Vector if a connection between this IT interface instance and IT interface instance Y would be valid—i.e., the ITInterface subclass of this instance correlates with the ITInterface subclass of ITInterface instance Y; returns a Vector containing error message(s) if subclasses of X and Y do not correlate.

Note that the verifyValidity( ) method is a NOOP in the ITInterface class—each subclass of ITInterface, with the exception of DefaultInterface, overrides this method with the appropriate logic. Also note that an ITInterface cannot be instantiated—only ITInterface subclasses have practical uses.

2.3.2 ITInterface Subclasses

A number of different interfaces may exist among IT structures. Each IT structure, by definition, includes the DefaultInterface, which is used to establish relationships not involving real interfaces, such as "requires presence of . . . to install". DefaultInterface supports any relationships. Other ITInterface subclasses are ("correlates" in this context means "can only be related to"):

- InstalledOn(<single>)—IT structure is installed using this interface (correlates with Supports)
- Supports({<single>|<multiple>})—IT structure(s) can be installed on this interface (correlates with InstallsOn)
- ConnectsTo(<connection type>, {<single>|<multiple>})—can connect to IT structure(s) using <connection type>, correlates with ConnectsTo where:
<connection e>::={<direct>|<network>|<messaging>|<other>}

- Invokes(<invocation type>, <single>)—can invoke IT structure using <invocation type>, correlates with Invokable
- Invocable(<invocation type>, {<single>|<multiple>})—can be invoked by IT structure(s) using <invocation type>, correlates with Invokes where:
<invocation e>::={<direct>|<interrupt>|<other>}

- Manages({<single>|<multiple>})—is managing IT structure(s), correlates with Manageable
- Manageable(<single>)—is managed by IT structure, correlates with Manages Table 3 shows valid ITInterface subclass correlations, wherein "yes" denotes a pair of correlated IT interfaces.

TABLE 3

| | Interface correlations | | | | | | | |
|---|---|---|---|---|---|---|---|---|
| | Default Interface | Installed On | Supports | Connects To | Invokes | Invocable | Manages | Manageable |
| DefaultInterface | yes | yes | yes | yes | yes | yes | yes | yes |
| InstalledOn | yes | | yes | | | | | |
| Supports | yes | yes | | | | | | |
| ConnectsTo | yes | | | yes | | | | |
| Invokes | yes | | | | | yes | | |
| Invocable | yes | | | | yes | | | |
| Manages | yes | | | | | | | yes |
| Manageable | yes | | | | | | yes | |

The IT interface subclasses are summarized as follows in terms of IT1, IT2, IF1, and IF2:
IT1: IT structure 1
IT2: IT structure 2
IF1: interface of IT structure 1
IF2: interface of IT structure 2

1) Installed On: a characteristic of IF1 permitting IT1 to be installed on IT2
2) Supports: a characteristic of IF2 permitting IT1 to be installed on IT2
3) ConnectsTo: a characteristic of IF1 permitting IT1 to connect to IT2
4) Invokes: a characteristic of IF1 permitting IT1 to invoke IT2
5) Invocable: a characteristic of IF2 permitting IT2 to be invoked by IT1
6) Manages: a characteristic of IF1 permitting IT1 to manage IT2
7) Manageable: a characteristic of IF2 permitting IT2 to be managed by IT1

Examples of IT interfaces are as follows:
A program is installed on a computer
A computer supports one or more programs to be installed on the computer
Computer A connects to computer B through a network
Program A invokes program B
Program B is invocable by program A
Program A manages system B
System B is manageable by program A In this embodiment, labor entities are associated with other entities by means of defaultInterface and defaultITRelationship. In another embodiment, a special ITInterface, laborinterface, may be defined, and used to comprise a laborRelationship to relate a labor entity to another entity.

2.3.3 Detailed Description of Non-Trivial Methods
2.3.3.1 Setavailable

Figure 5:
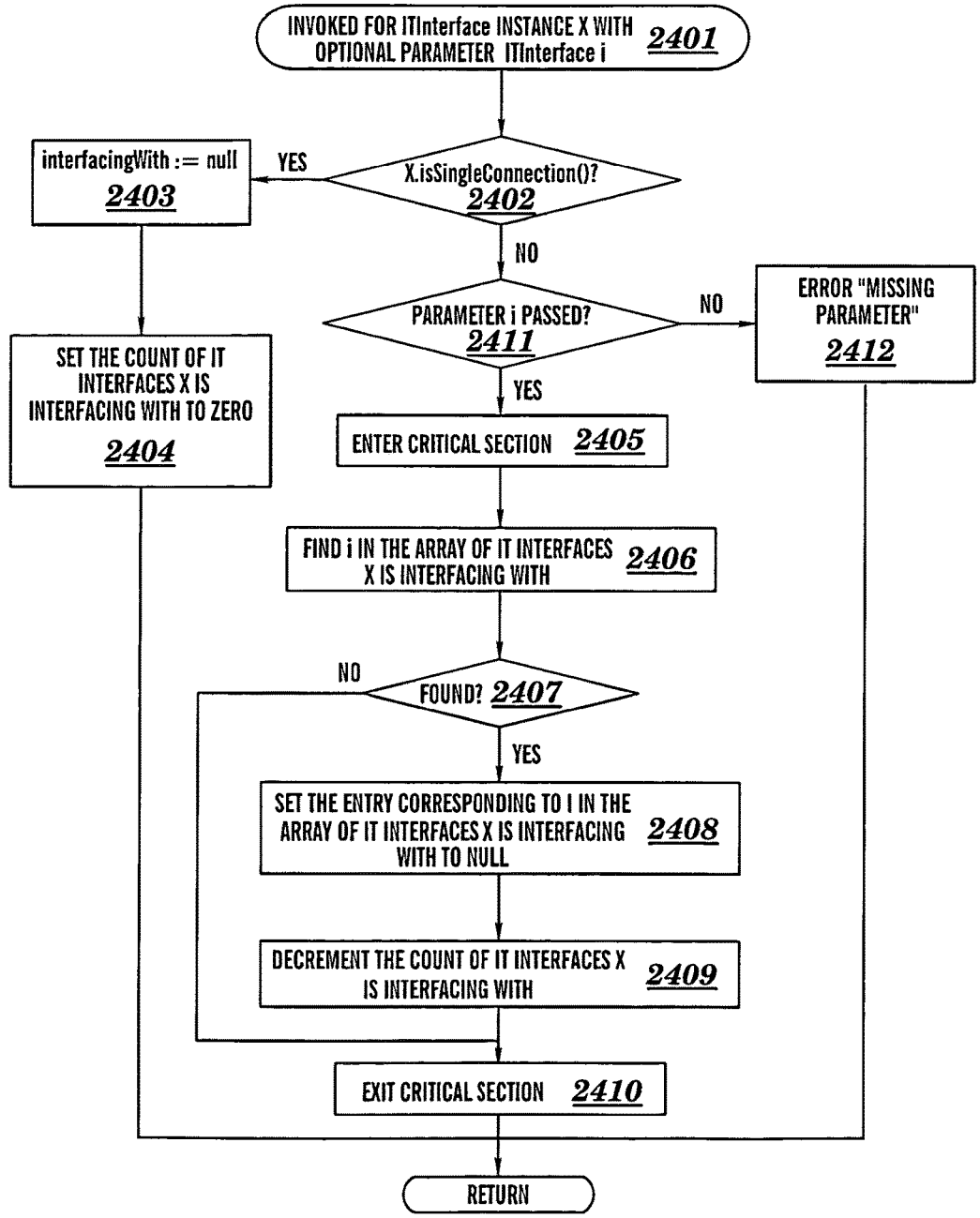
FIG. 5 is a flow chart, depicting the logic of setAvailable( ) method, in accordance with embodiments of the present invention.

FIG. 5 is a flow chart, depicting the logic of setAvailable( ) method, in accordance with embodiments of the present invention. The setAvailable([ITInterface i]) method makes ITInterface available; an ITInterface parameter i may be specified for multi-connection IT interfaces to indicate which of the multiple connections is to be made available. The setAvailable( ) method is invoked for ITInterface instance X with an optional parameter ITInterface i 2401. If IT interface instance X is a single-connection IT interface (X.isSingleConnection( ) returns true) 2402, the field interfacingWith in ITInterface X is set to null 2403, and the count of IT interfaces X is interfacing with is set to zero 2404. Note that it is the responsibility of the invoker to ensure that the corresponding IT interface that was interfacing with X (if any) also becomes available.

If ITInterface X is a multiple-connection IT interface 2402, processing ensures that a parameter i is passed, indicating which connection out of the multitude to make available. If parameter i is not passed 2411, and an error is signaled 2412, and processing terminates. The mechanism of signaling an error may vary, depending on implementation, and may include, but is not limited to, an error message, an exception, an ABEND, a log and/or a trace entry.

Upon ascertaining availability of parameter i 2311, processing enters a critical section 2405. ITInterface i passed as the parameter to method setAvaliable( ) is located in the array of IT interfaces ITInterface X is interfacing with 2406. If i is not found 2407, processing terminates after exiting a critical section 2410. If i is found 2407, the method sets the entry in the array of IT interfaces ITInterface X is interfacing with that corresponds to i to null 2408, decrements the count of IT interfaces X is interfacing with 2409, and exits the critical section 2410.

2.3.3.2 Establishinterface

Figure 6:
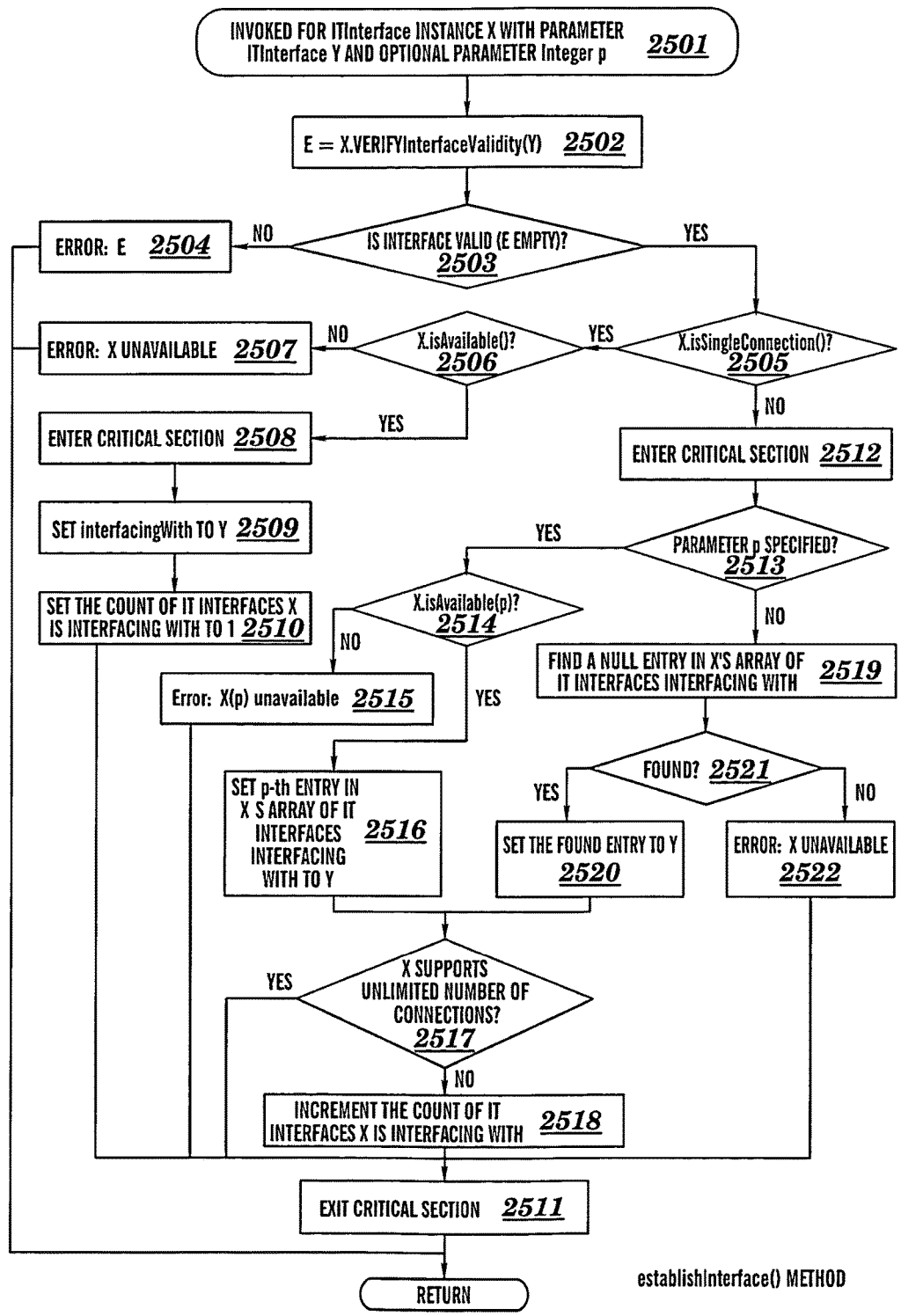
FIG. 6 is a flow chart depicting the logic of establishInterface( ) method, in accordance with embodiments of the present invention.

FIG. 6 is a flow chart depicting the logic of establishInterface( ) method, in accordance with embodiments of the present invention. The establishInterface(ITInterface i [, int p]) method establishes an interface with the parameter IT interface; returns an empty Vector if interface was established successfully, and a list of error messages otherwise. The establishInterface( ) method is invoked for ITInterface instance X with a parameter ITInterface Y and an optional parameter integer p 2501.

The method starts by verifying validity of establishment of connection between X and Y (by invoking method X.verifyValidity(Y)) 2502. If establishment of connection between X and Y is invalid (X.verifyValidity(Y) returns error message(s)) 2503, method establishInterface( ) returns the error message(s) returned by X.verifyValidity(Y) invocation 2504 and terminates processing.

If ITInterface X is a single-connection interface 2505, but X is available 2506, method establishInterface( ) returns and error message 2507 and terminates processing. Otherwise, if X is a single-connection interface 2505 and X is available 2506, a critical section is entered 2508 the interfacingWith reference of ITInterface X is set to Y 2509, the count of IT interfaces X is connected with is set to one 2510, the critical section is exited 2511, and processing completes successfully.

For a multiple-connection ITInterface X 2505, critical section is entered 2512. If the optional parameter p was specified on invocation of method establishInterface( ) 2513, but p-th entry of X's array of connections is not null (X.isAvailable(p)=false), indicating that the p-th connection of X is unavailable 2514, an error message is stored 2515, the critical section is exited 2511, and processing terminates. If, on the other hand, the p-th connection of X is available 2514, the p-th entry in X's array of connections is set to Y 2516.

If the optional parameter p was not specified on invocation of method establishInterface( ) 2513, an attempt is made to find an available (null) entry in X's array of connections 2519. If an available entry is found 2521, the found entry is set to Y 2520, otherwise an error message is stored 2522, and processing terminates after exiting the critical section 2511.

If a connection was established 2516 2520, if ITInterface X does not support an unlimited number of connections 2517, the count of connections of X is incremented 2518. The method establishInterface( ) then exits the critical section 2511 and completes its processing.

2.4 IT Relationships

An IT Relationship is a pair of associated (established) IT interfaces belonging to two different IT structure instances. Note that the notion of IT relationship is introduced for convenience. This notion is not absolutely necessary for the model, since a pair of established IT interfaces can always be considered in and of itself, but IT relationships represent a convenient way of tracking interfacing IT structure pairs.

A symmetric IT relationship is an IT relationship, involving IT interfaces of identical class. Examples of a symmetric IT relationship include:
1) IT structure A uses ConnectsTo interface to relate to IT structure B, and IT structure B uses ConnectsTo interface to relate to IT structure A.
2) IT structure A uses DefaultInterface to relate to IT structure B, and IT structure B uses DefaultInterface to relate to IT structure A.

An asymmetric IT relationship is an IT relationship, involving IT interfaces of different classes. As an example, IT structure A InstallsOn IT structure B, while IT structure B Supports IT structure A.

An abstract IT relationship instance is an IT relationship interface instance involving at least one abstract IT interface instance.

A virtual IT relationship instance is a non-abstract IT relationship instance involving at least one virtual IT interface.

A real IT relationship instance is an IT relationship instance involving only real IT interface instances.

2.4.1 ITRelationship Class

ITRelationship class inherits from ITEntity class and has the following methods:
1) ITRelationship(String name, Type type[, ITInterface A, B])—constructor, establishes a relationship <name> of type <type> using IT interfaces A and B, or defaultInterface if A and B are not specified.
2) boolean isSymmetric( )—returns true if relationship is symmetric, false otherwise
3) [ ] ITInterface getRelatedITInterfaces( )—returns the pair of ITInterface instances involved in a relationship ITRelationship cannot be instantiated—only ITRelationship subclasses have practical uses.

2.4.2 ITRelationship Subclasses

Subclasses of the ITRelationship class are predicated by the types of IT interfaces included in the model. The following IT relationships may exist given the types of IT interfaces defined above:
  DefaultITRelationship—two IT structures are related in an unidentified way
  InstallationITRelationship—IT structure 1 is installed on IT structure 2
  CommunicationITRelationship(<connection type>)—IT structure 1 communicates to IT structure 2 using <connection type>
  InvocationITRelationship(<invocation type>)—IT structure 1 invokes IT structure 2
  ManagementITRelationship—IT structure 1 manages IT structure 2

2.5 IT Dependencies

An IT dependency is a characteristic of an ITStructure class, indicating requirements of this ITStructure class instances for presence or absence of this or other ITStructure class instances.

A symmetric IT dependency is an IT dependency which can be applied to ITStructure subclasses involved, regardless of the order of ITStructure subclasses in the IT dependency predicate. For example, IT structure A depends on IT structure B, and IT structure B depends on IT structure A in the same way. The order of A and B in the previous sentence may be reversed without a change in meaning of the sentence.

An asymmetric IT dependency is a non-symmetric IT dependency (i.e., it cannot be applied to ITStructure subclasses involved regardless of their order in the IT dependency predicate). For example: IT structure A depends on IT structure B, but IT structure B does not depend on IT structure A.

2.5.1 ITDependency Class

ITDependency class inherits from ITEntity class and has the following methods:
1) ITDependency(String name, String A, B)—constructor, establishes a dependency of ITStructure subclass A on ITStructure subclass B, where A and B are names of subclasses.
2) boolean isSymmetric( )—returns true if relationship is symmetric, false otherwise
3) [ ] String getDependentClasses( )—returns the pair of names of ITStructure subclasses involved in an IT dependency.

ITDepdendency cannot be instantiated—only ITDependency subclasses have practical uses.

2.5.2 ITDependency Subclasses

A number of different dependencies may exist among IT structures comprising (i.e., included in a complex IT structure's composition) or potentially comprising an IT structure (i.e., having a potential of being included in a complex IT structure's composition). For the purposes of this definition, the following dependencies (ITDependency subclasses) are considered (i.e., other dependencies may be defined as appropriate for the structural model):
1) RequiresPresenceOf—as in "IT structure 1 requires presence of IT structure 2"
2) ExclusiveWith—Negation of 1—as in "IT structure 1 is exclusive with IT structure 2", IT structure 1 cannot be installed or operate in the presence of IT structure 2

In this embodiment, no difference is made between requirement of presence for installation and requirement of presence for operation, and the corresponding exclusivity. In another embodiment, such distinction could be made.

2.6 IT Delivery Environment

An IT delivery environment (or delivery environment) is a collection of rules, policies, practices, and associated support functions, including labor, physical space, power supply, hardware, software, networking, and management facilities involved in operating a data center, as well as means of provisioning and deployment of the aforementioned support functions. IT delivery environment also includes a collection of all delivery-bound real IT structures operating in it or in process of being deployed.

IT delivery environment may be null if every IT structure in it operates independently, does not use any data center services, no data center infrastructure exist, and no rules or standards are imposed on IT structures by the delivery environment. For example: a stand-alone personal computer is operated in a null IT delivery environment.

A delivery-bound IT structure is a virtual IT structure that can be provisioned and deployed in a particular IT delivery environment.

2.6.1 ITDeliveryEnvironment Class

ITDeliveryEnvironment class inherits from ITStructure and is always a complex IT structure. ITDeliveryEnvironment composition includes all IT structures deployed in the delivery environment. ITDeliveryEnvironment composition may (and normally would) also include one or more IT structures representing data center infrastructure.

Unlike ITStructure, ITDeliveryEnvironment permits an empty composition—empty composition is valid for the null IT delivery environment.

In addition to the standard ITStructure methods, ITDeliveryEnvironment includes the following methods:
1) Vector verifyConformance(ITStructure A)—verifies conformance of an IT structure to the rules of the IT delivery environments. Returns an empty Vector if the parameter IT structure conforms to the IT delivery environment rules, and a Vector containing a list of error message strings if the parameter IT structure does not conform to the IT delivery environment rules. This method is a NOOP for the null IT delivery environment.

Example: A set of product standards may be established by a data center, such that for certain types of products only products included in the standard set may be used—e.g., operating systems may be restricted to UNIX, and Windows; e.g., UNIX hardware platforms may be restricted to RS/6000 model F50 or H50 and no other computer may be used to run UNIX. verifyConformance( ) method in this case would examine the composition of its parameter IT structure (recursively, if the parameter IT structure is complex) and ensure that it only includes products for operating systems and hardware platform for UNIX that are either within the established set of standards or have higher level of abstraction than specific operating system and specific type of hardware.

2) Vector addElement({<new>|<update>}, ITStructure A)—overrides the parent class addElement( ) method; performs delivery binding of a virtual IT structure. Returns a Vector containing a delivery-bound IT structure as the first element if delivery binding is successful, and a list of error messages otherwise. This method is a NOOP (i.e., returns the input virtual IT structure as the first element of the returned Vector) for the null IT delivery environment. <new> or <update> input parameter may be specified to indicate whether this is a binding of a newly added IT structure, or an update of an existing IT structure.

3) Vector deploy({<new>|<update>}, ITStructure A)—initiates deployment of a delivery-bound IT structure. Returns a Vector containing error messages if processing is unsuccessful, and a null Vector otherwise. <new> or <update> input parameter may be specified to indicate whether this is a deployment of a new IT structure, or a change to an existing IT structure.

Note that all methods of ITDeliveryEnvironment class are subclass-specific. Class ITDeliveryEnvironment includes NOOP placeholders.

2.7 Extending Entity Model

The above model provides a foundation for building an IT class library. However, it is highly abstract and insufficient for effective modeling of IT. A set of general extensions, with its classes inheriting from the appropriate base IT classes, defining basic IT constructs, such as computers or network devices, is required as further foundation. Such extended class libraries exist—e.g., Common Information Model (CIM).

Figure 18:
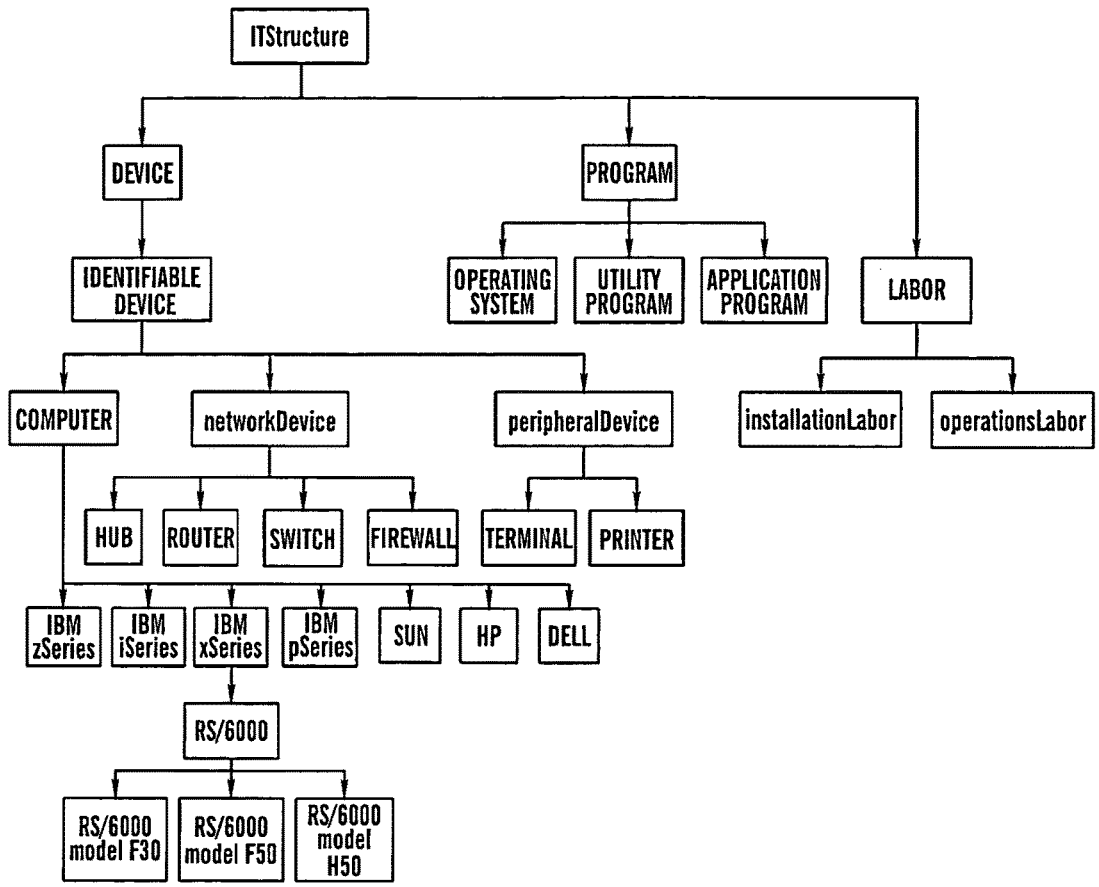
FIG. 18 is an extended class hierarchy example, in accordance with embodiments of the present invention.

Another example of such class hierarchy is described in FIG. 18, in accordance with embodiments of the present invention. FIG. 18 is an example of a set of extensions going from the class hierarchy origin (ITEntity) down to a set of specific computer models shown at a lowest hierarchical level as the virtual IT structures RS/6000 model F30, RS/6000 model F50, and RS/6000 model H50. FIG. 18 also shows intermediate hierarchical levels having successively lower degrees of abstraction. For example, consider the following example path through the hierarchical representation shown in FIG. 18: ITStructure, device, Identifiable Device, computer, IBM xSeries, RS/6000, RS/6000 model F50. In the preceding example, device is less abstract than ITstructure, IdentifiableDevice is less abstract than device, computer is less abstract than IBMxSeries, IBMxSeries is less abstract than RS/6000, and RS/6000 is less abstract than RS/6000 model F50. The lowest level IT structure of RS/6000 model F50 is a virtual IT structural, though not delivery bound.

The present invention discloses a translator (see Section 2.10 infra) to translate the abstract IT structure at the highest level (denoted as ITStrucure) to the virtual IT structures RS/6000 model F30, RS/6000 model F50, and RS/6000 model H50. To effectuate such translation, all of the intermediate IT structures shown in FIG. 18 may be stepped through in order to arrive at the final virtual IT structures (e.g., RS/6000 model F30, RS/6000 model F50, RS/6000 model H50, etc.). In some embodiments, however, the designer may provide sufficient input description (typically stored in libraries) so that the translator may not have to step through all of the intermediate IT structures shown in FIG. 18 to arrive at the final virtual IT structures. For example, a requirement that a particular IT structure can store and execute software may imply that the particular IT structure is a computer, so that the intermediate levels of device and IdentifiableDevice in the preceding example path could be skipped by the translator.

Figure 15:
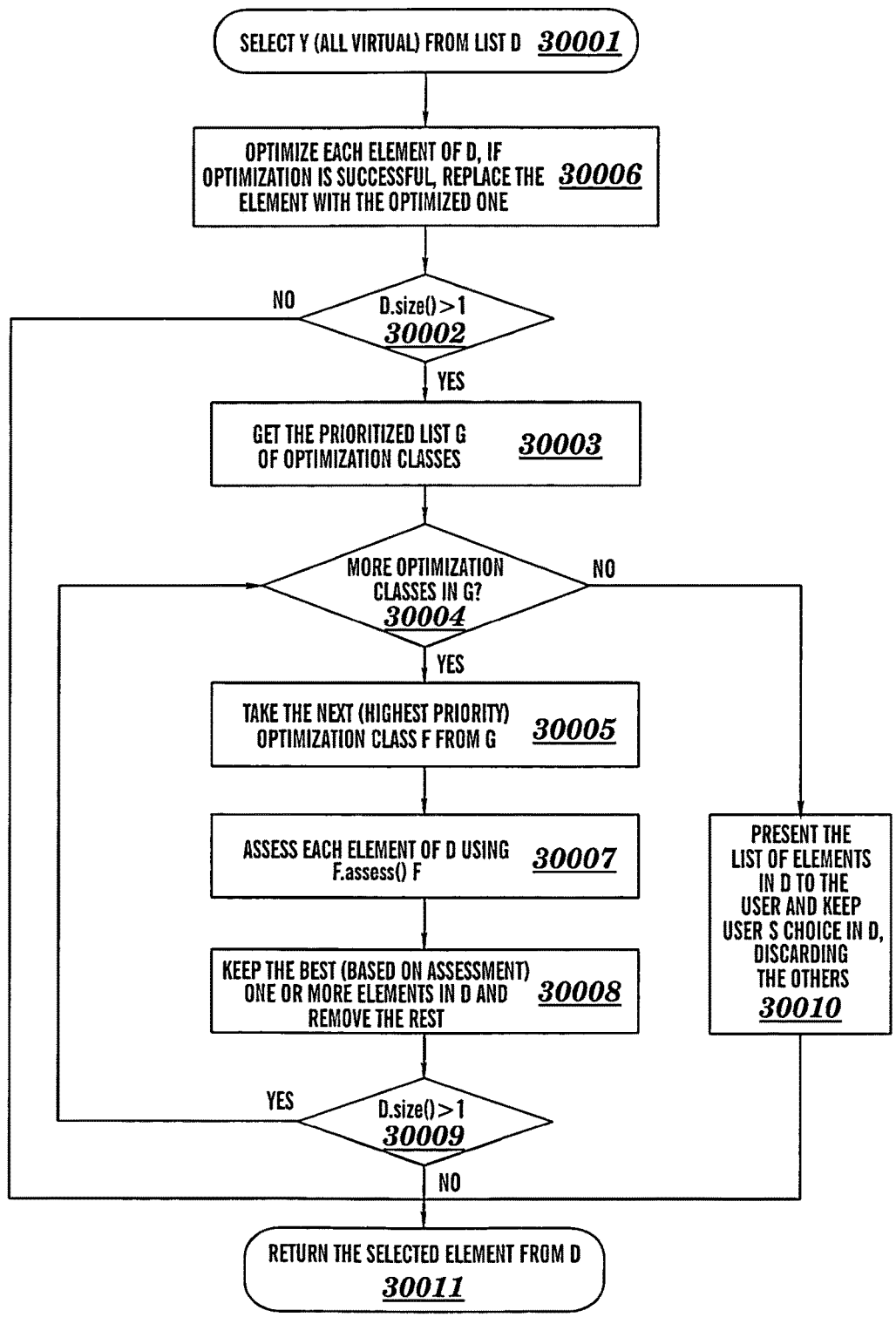
FIG. 15 is a flow chart depicting the process of selecting the best translation candidate from a list of translation candidates, in accordance with embodiments of the present invention.

Although each IT structure box in FIG. 18 is a primitive IT structure, a box appearing in the hierarchy of FIG. 15 could alternatively be a complex IT structure. For example, a box in the hierarchy could represent a client-server architecture as a complex IT structure having primitive elements of server and client.

2.8 Extended IT Delivery Environment

Similar to ITStructure subclasses, the ITDeliveryEnvironment class can have subclasses, used to define various delivery environments. All of ITDeliveryEnvironment subclasses must override two methods: verifyConformance( ) and addElement( ). The verifyConformance( ) method verifies whether a particular IT structure can be deployed and can operate within a given instance of an ITDeliveryEnvironment subclass. The addElement( ) method performs delivery binding of an IT structure to the IT delivery environment subclass instance if the IT structure has been previously verified via verifyConformance( ) to be depoyable and operable within the IT delivery environment defined by the given instance of an ITDeliveryEnvironment subclass.

While this embodiment does not attempt to enumerate all possible delivery environments, an example ITDeliveryEnvironment subclass, called StandardizedITEnvironment is described. The key characteristic of the StandardizedITEnvironment is that it imposes product standards and restricts IT structures deployed and operated within it only to the allowable product set. So, the verifyConformance( ) method of StandardizedITEnvironment checks primitive composition of its argument target IT structure and indicates conformance only if every element of the primitive composition of the target IT structure belongs to the set of primitive IT structures permitted by the ITDeliveryEnvironment subclass. For example, the ITDeliveryEnvironment subclass may restrict a computer to be an IBM xSeries computer or an IBMzSeries computer.

Another embodiment for using the verifyConformance( ) method is a situation in which an IT structure is currently deployed in IT delivery environment A, but it is desired that this IT structure migrate to IT delivery environment B. Accordingly, this IT structure would be checked against the verifyConformance( ) method of delivery environment B to determine if this IT structure could be deployed in delivery environment B.

Figure 19:
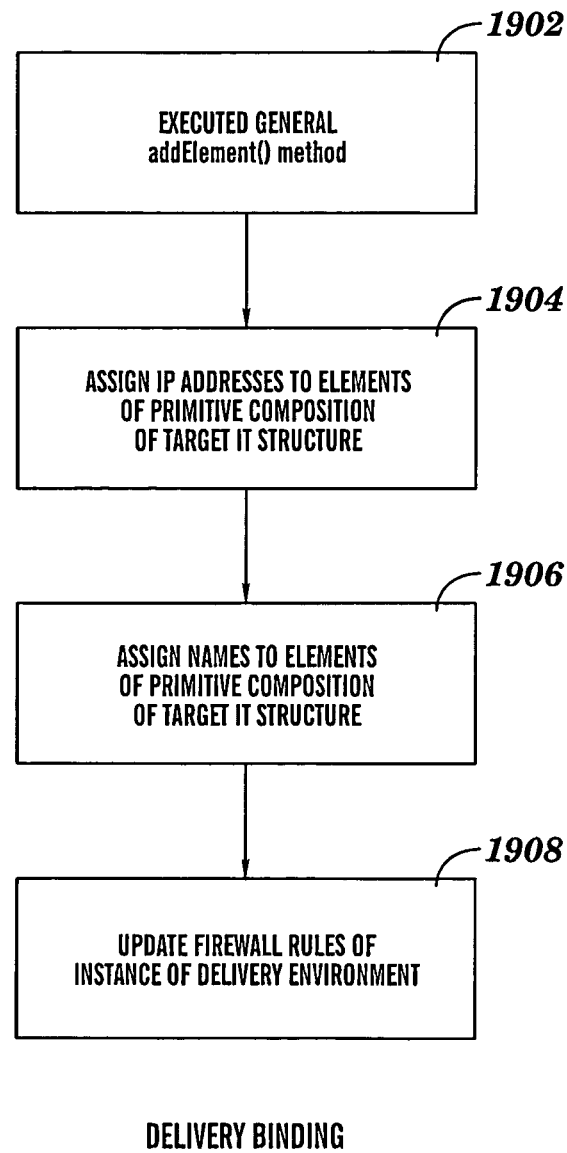
FIG. 19 is a flow chart for implementing delivery binding of an IT structure to a delivery environment, in accordance with embodiments of the present invention.
Figure 20:
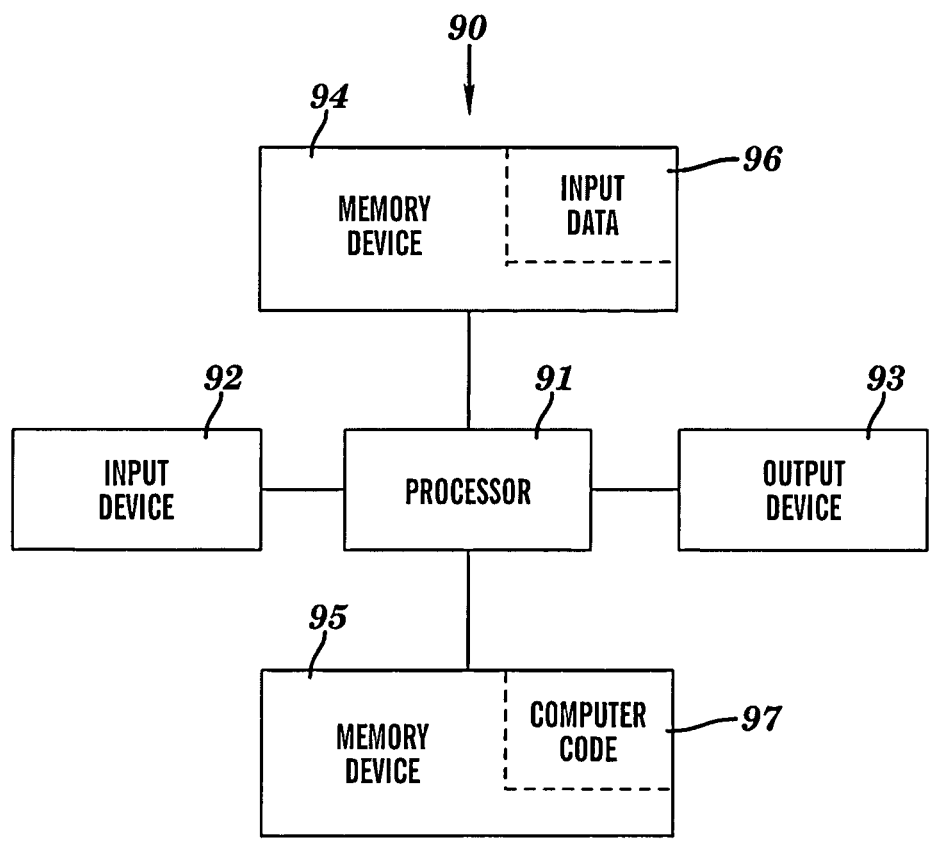
FIG. 20 illustrates a computer system used for implementing an IT Entity Model and associated processes, in accordance with embodiments of the present invention.

FIG. 19 is a flow chart depicting a modified addElement( ) method of StandardizedITEnvironment to perform delivery binding of the argument target IT structure to the instance of StandardizedITEnvironment, in accordance with embodiments of the present invention. The modified addElement( ) method effectuates IT delivery binding by invoking the general addElement( ) method of FIG. 3 with an addition of elements required to delivery bind the IT structure to a given IT delivery environment. As a part of this process, the modified addElement( ) method of FIG. 19 includes the general addElement( ) method 1902 of FIG. 3. If at least one element of the primitive composition of the delivery-bound IT structure requires access to the Internet, then the modified addElement( ) method assigns 1904 IP addresses to the elements of primitive composition of the target IT structure requiring IP addresses, these IP addresses being unique relative to the current primitive composition of the instance of StandardizedITEnvironment and adhering to the IP addressing policy of the instance of StandardizedITEnvironment. Similarly, the addElement( ) method assigns names 1906 to the elements of primitive composition of the target IT structure requiring names, and ensures uniqueness of these names relative to the current primitive composition of the instance of StandardizedITEnvironment and adherence of these names to the naming policies of the instance of StandardizedITEnvironment. If target IT structure requires access to the Internet through the firewall(s) provided by the instance of StandardizedITEnvironment, the firewall rules of the instance of StandardizedITEnvironment are updated 1908 to permit the appropriate communications.

2.8.1 Verifying Conformance of an ITStructure to an Exemplary Delivery Environment The exemplary delivery environment is a data center and is aimed at providing the highly-available branded infrastructure for Internet-accessible IT applications.

The data center is a new, state-of-the-art facility. It is built on today's technology and practices a philosophy of being a security-focused operation. Activities and services are monitored by an experienced technical staff 24×7 from the Network Operations Center (NOC).

The facilities include 3,000 square feet of raised floor, a network operations monitoring center, conference rooms, administrative space and coffee room.

The physical space of the data center has a secure co-location in a 3,000 square foot room with 18" raised floor and is ADA (Americans with Disabilities Act)-compliant. The physical space includes 27"×39"×84" cabinets with internal vertical cable management and vented front and back doors. All hardware must fit into cabinets. No space other than cabinets is provided.

The electrical power to the data center from NYSEG (New York State Electric and Gas Company) is delivered by dual redundant feeds. The electric service in the building is connected to a parallel redundant UPS. There is a backup 1000 KW diesel generator with 7-day fuel reserve.

Primary internet access of the data center is via AT&T Gigabit Ethernet over multi-mode fiber to their national fiber network node located in adjacent building. This network node has eight connections to the AT&T network. Alternate internet access is via 100 Mbps Ethernet over single-mode fiber connection to the Cable & Wireless Network.

Security for the data center includes access control by Smart Card system issued by NOC personnel staffed 24×7× 365 (24 hours, 7 days a week, 365 days a year). Data center floor access is controlled by access card and biometric scan. Visitors are granted access by duly authorized representatives of the data center clients. A biometric scan and surrender of the visitor's driver's license for a proxy card is required for visitors to gain access from the lobby to the administrative area. Another biometric scan and use of the access card is required to enter the raised floor area.

Figure 9:
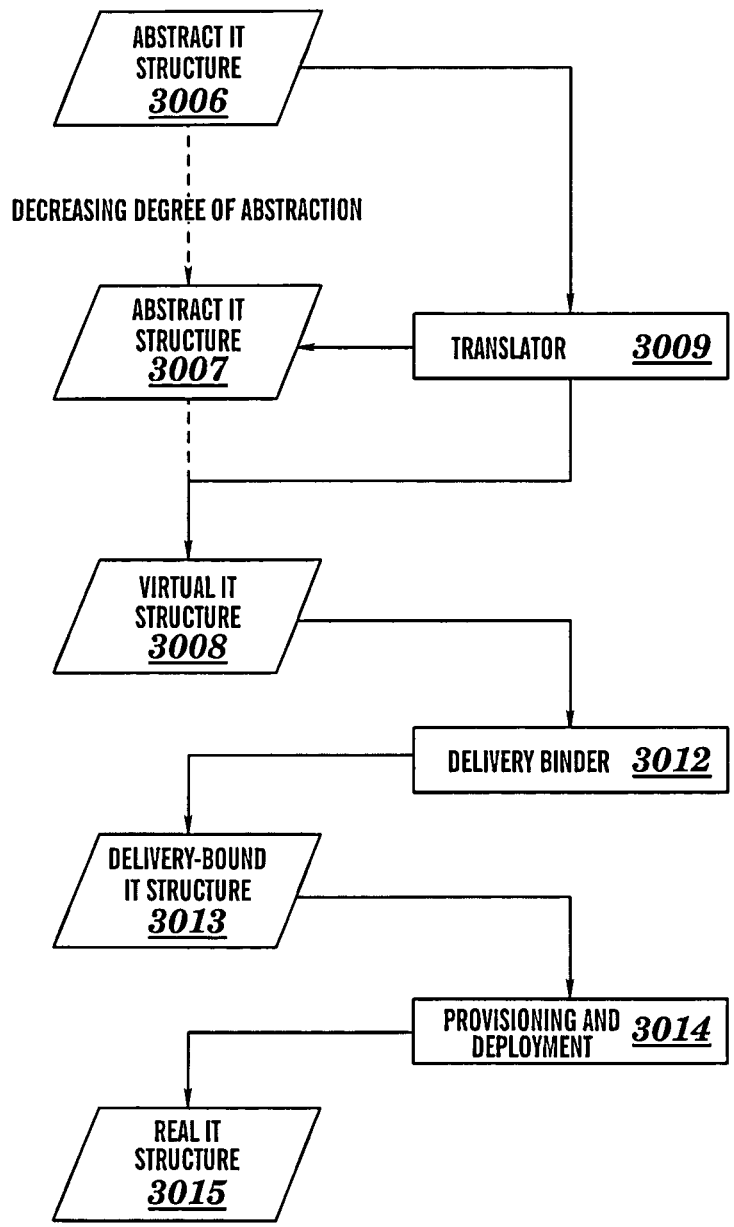
FIG. 9 is a chart depicting the IT development process, in accordance with embodiments of the present invention.
Figure 10:
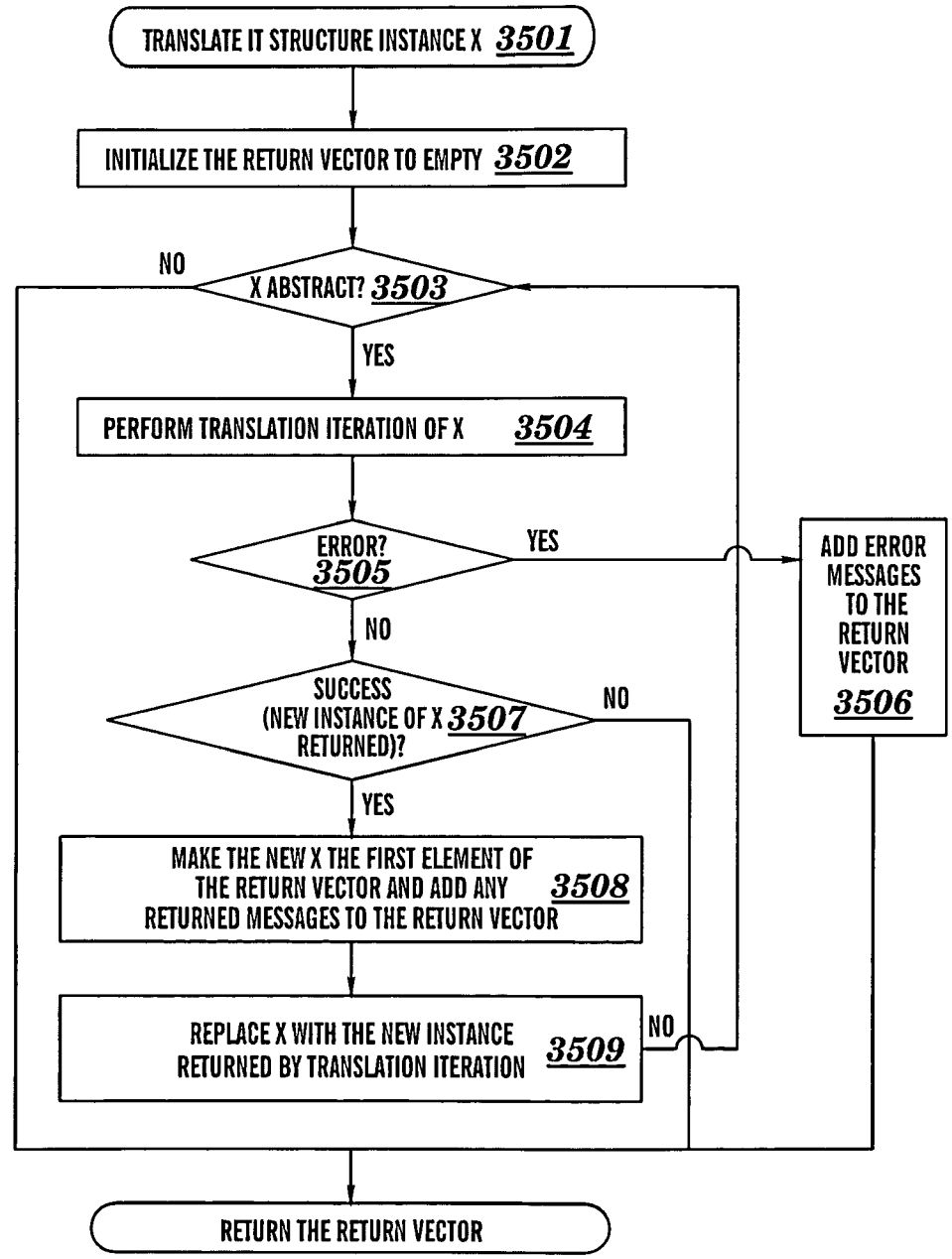
FIG. 10 is a flow chart depicting the process of translation of an IT structure instance, in accordance with embodiments of the present invention.

Conformance factors for the IT structure to the above IT delivery environment (i.e., data center) include:

- Electric power availability, reliability (and possibly voltage)
- Ability to introduce devices out of the list of "supported" devices
- Ability to use specific software, or requirement to run specific software (e.g., for monitoring or virus defense)
- Availability of specific rack sizes/space
- Ability to use geometrically non-standard devices
- Compliance to physical network layer (jack types; switches/hubs; network speed)
- Compliance to monitoring/admin access (e.g., there may be a requirement to have an extra network interface per physical box for admin access)
- Possible conflict of application availability requirements to DE service window
- Network bandwidth requirements
- Internet availability requirements (dual-ISP, etc. . . . )
- Architectural requirements with respect to network (layering, firewalls, IP addressing schema, network isolation requirements)
- Network traffic requirements (e.g., "This IT Delivery Environment will allow only HTTP/HTTPS traffic from the Internet to your hosts"; "We do not allow outgoing traffic on port 25 directly, you must use one of our SMTP servers if you want to send email")
- Application type limitations ("We do not allow mass-mailing applications")
- Security level provided by IT Delivery Environment versus IT structure security requirements 2.9 IT Development Process FIG. 9 is a chart depicting the IT development process, in accordance with embodiments of the present invention. Translator 3009 (see Sec. 2.10; FIG. 10) may be used in a translation process to translate an abstract IT structure 3006 into another abstract IT structure 3007 having a lower degree of abstraction than abstract IT structure 3006. This translation process may be recursively repeated until the abstract IT structure 3006/3007 has been translated into a virtual IT structure 3008 or until the translation process aborts due to an unsuccessful translation attempt. Alternatively, a single translation of abstract IT structure 3006 by translator 3009 may produce the virtual IT structure 3008. The virtual IT structure 3008 serves as input to the delivery binder 3012 (see Sec. 2.11; Sec. 2.2.2.5, addElement( ) method, FIG. 3), which translates the virtual IT structure into a delivery-bound IT structure 3013, elements of which are then provisioned and deployed 3014 (see Sec. 2.12; deploy( ) method), resulting in a real IT structure 3015 operating in the appropriate IT delivery environment.

2.10 Translation

Figure 11:
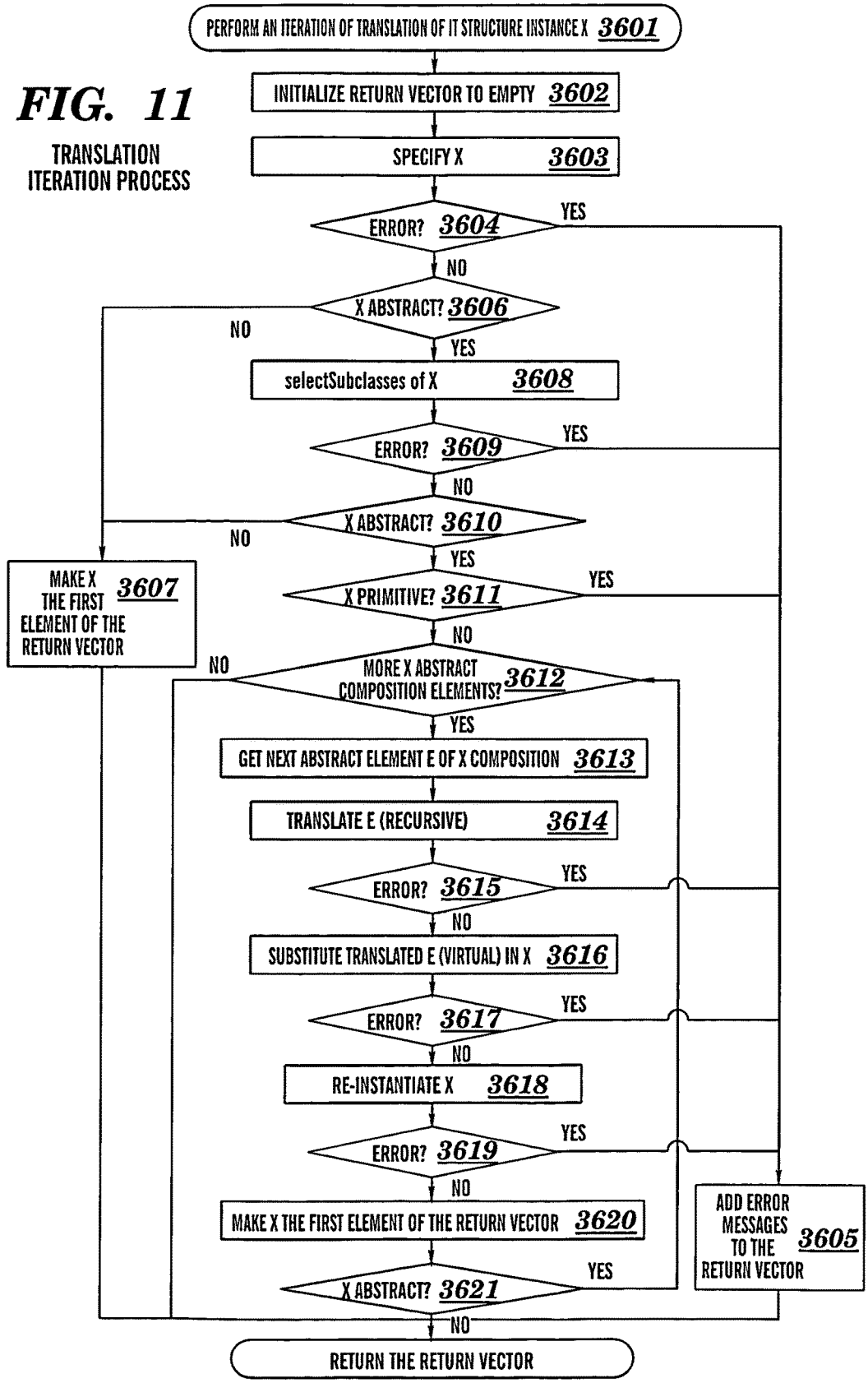
FIG. 11 is a flow chart depicting the translation iteration process, in accordance with embodiments of the present invention.

Translation is performed on an abstract IT structure instance with the intention of obtaining a virtual IT structure, which can then be optimized and bound to one or more IT delivery environment to obtain one or more real IT structure. FIGS. 10 and 11 collectively describe an IT translator (ITRAN) adapted to translate an abstract IT structure to the virtual IT structure.

FIG. 10 is a flow chart depicting the process of translation of IT structure instance X 3501, in accordance with embodiments of the present invention. The process starts by initializing the return Vector 3508 to an empty Vector 3502. If X is not abstract 3503, no translation is necessary, and a null return Vector is returned to indicate that no action was performed (and no errors occurred).

The process then performs a series of iterations until either an error occurs or a virtual IT structure is obtained. The process invokes the translation iteration process 3504, as described infra in relation to FIG. 11, to iteratively translate the abstract elements of X (i.e., the IT structures in the composition of X) until an instantiation of X following said iterative translation is virtual. If an error is indicated by the translation iteration (by returning error message(s)) 3505, any error messages returned by the translation iteration process are added to the return Vector 3506 and processing terminates. If translation iteration processing did not indicate an error 3505, a check is performed to ascertain whether the translation iteration processing was successful 3507 (i.e., the translation iteration process returned a new instance of IT structure X), and if so, the new instance of IT structure X returned by the translation iteration process is made the first element of the return Vector 3508, and the current instance of IT structure X is replaced with the new instance of IT structure X returned by the translation iteration process 3509. The process then loops back to the check of whether the instance of IT structure X is still abstract 3503.

FIG. 11 is a flow chart depicting the translation iteration process, which is performed for an IT structure instance X 3601, in accordance with embodiments of the present invention. The process iterates through the abstract elements of X's composition to perform a translation of each abstract element of X, wherein the iterations end when a re-instantiation of X results in X being virtual (i.e., being in a virtual state).

The process starts by initializing the return Vector 3620 to an empty Vector 3602. The process then invokes the process of specification for X 3603, which may be a NOOP if X is fully specified, or, if X is not fully specified, will ensure full specification of characteristics of X. If an error occurs during the specification process for X 3604, any error messages returned by the specification process are added to the return Vector 3605 and processing terminates.

The process then checks whether X is abstract 3606, and if X is no longer abstract (i.e., X is now virtual), the process makes X the first element of the return Vector 3607 and returns.

If X is still abstract 3606, the process invokes selection of subclasses for X 3608. If an error occurs during subclass selection 3609, any error messages returned by the subclass selection process are added to the return Vector 3605 and processing terminates.

If subclass selection did not indicate an error 3609, the process checks whether X is still abstract 3610, and if X is no longer abstract (i.e., X is now virtual), the process makes X the first element of the return Vector 3607 and returns.

If X is still abstract 3610, the process checks whether X is primitive 3611, and if so, the process places a translation error message in the return Vector 3607 and processing terminates. The reason for this is that subclass selection process for a primitive IT structure has searched all possible subclasses of X (including any existing virtual IT structures) and has not found one that would represent a satisfactory translation result for X—i.e., no possible virtual IT structure exists that would satisfy functional, operational, and other requirements and/or constraints imposed on X.

If X is complex 3611, the process iterates through abstract elements of X's composition 3612. Because X is still abstract, by definition of abstract IT entities, X's composition includes at least one abstract element. Each iteration through X's composition finds the next abstract element E of X's composition 3613 and recursively invokes the translation process for E 3614. If an error occurs during translation of E 3615, any error messages returned by the recursive invocation of the translation process are added to the return Vector 3605 and processing terminates.

Figure 14:
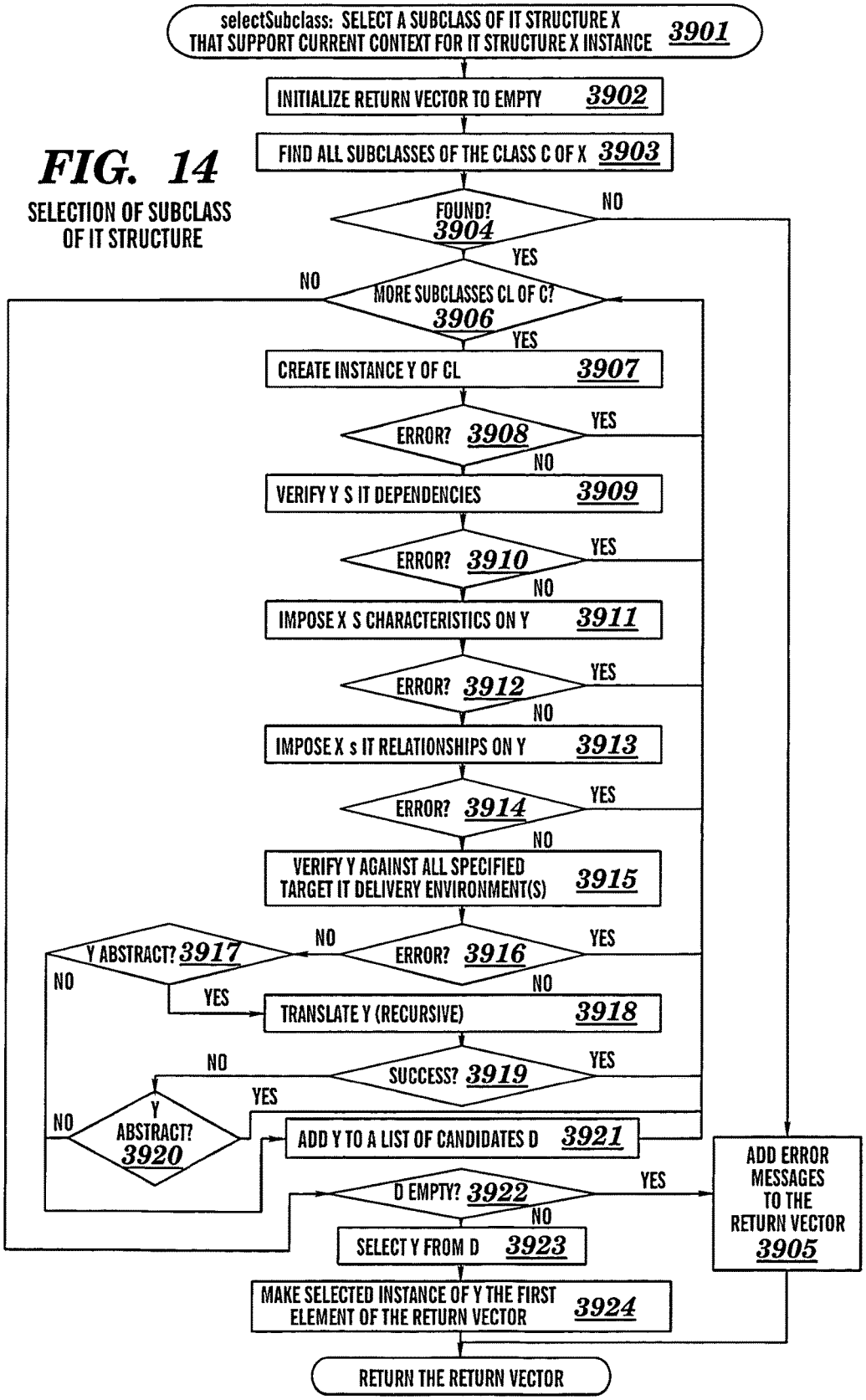
FIG. 14 is a flow chart depicting the process of selection a subclass of an IT structure, in accordance with embodiments of the present invention.

If translation process is successful and returns a new instance of E 3615, the new instance of E (denoted as $E_{NEW}$) is substituted for the current instance of E in the composition of X 3616. The process of substitution (not shown, but an analogous process is shown in FIG. 14) involves ensuring that any IT dependencies in X involving E are still satisfied, any IT relationships in X involving E are still valid and established, any characteristics of X (functional, operational, or other) are still supported, and X is still valid for any IT delivery environment for which it is targeted.

X (with $E_{NEW}$ substituted therein) is then re-instantiated 3618 to form an interim IT structure instance. If an error occurs during re-instantiation of X 3619 (e.g., if the interim IT structure instance is not virtual), error messages are added to the return Vector 3605 and processing terminates.

X (now re-instantiated) is then made the first element of the return Vector 3620. If X is no longer abstract 3621 (i.e., it is virtual), the return Vector (including X as its first element) is returned and processing terminates. If X is still abstract 3621, processing iterates to finding the next abstract composition element of X 3612.

Figure 12:
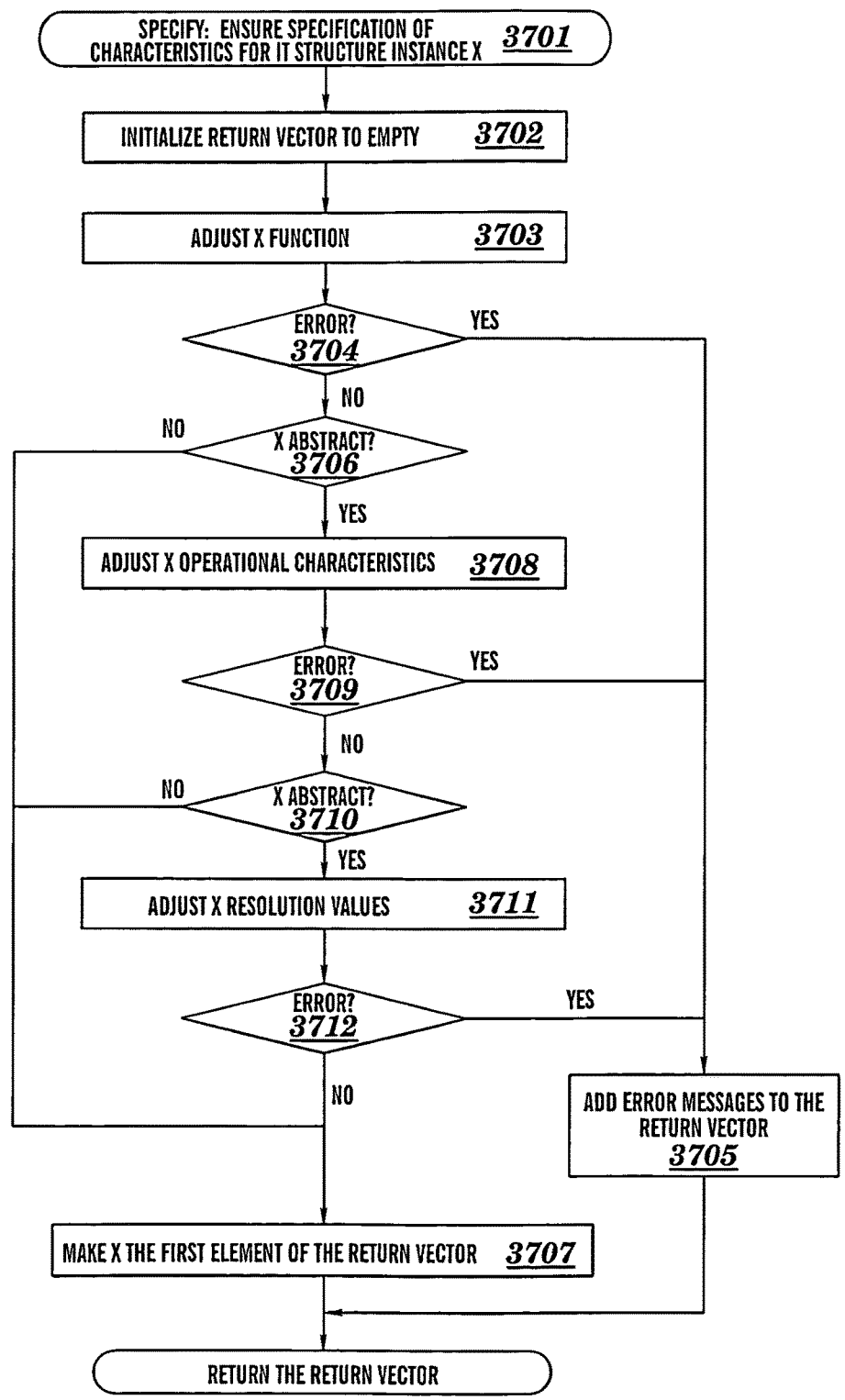
FIG. 12 is a flow chart depicting the process of ensuring specification of characteristics of an abstract IT structure instance, in accordance with embodiments of the present invention.

FIG. 12 is a flow chart depicting the process of ensuring specification of characteristics of abstract IT structure instance X 3701, in accordance with embodiments of the present invention. The process starts by initializing the return Vector 3707 to an empty Vector 3702. The process then invokes the adjustment process for the X's function(s) 3703. The adjustment process for a particular characteristic of an IT structure may be a NOOP if that characteristic is fully specified, or, otherwise, will ensure full specification of that characteristic. If an error occurs during the adjustment of X's function(s) 3704, any returned error messages are added to the return Vector 3705 and processing terminates.

The process then checks whether X is still abstract 3706. It is conceivable that as a result of invocation of setFunctions( ) method of X, X became virtual. If this is the case, X is made the first element of the return Vector 3707 and processing terminates.

If X is still abstract 3706, the process invokes the adjustment process for the X's operational characteristics 3708. If an error occurs during the adjustment of X's operational characteristics 3709, any returned error messages are added to the return Vector 3705 and processing terminates.

The process then once again checks whether X is still abstract 3710. It is conceivable that as a result of invocation of setOperationalCharacteristics( ) method of X, X became virtual. If this is the case, X is made the first element of the return Vector 3707 and processing terminates.

If X is still abstract 3710, the process invokes the adjustment process for the X's resolution values 3711. If an error occurs during the adjustment of X's resolution values 3712, any returned error messages are added to the return Vector 3705 and processing terminates, otherwise, the process makes X the first element of the return Vector 3707 prior to completion.

Figure 13:
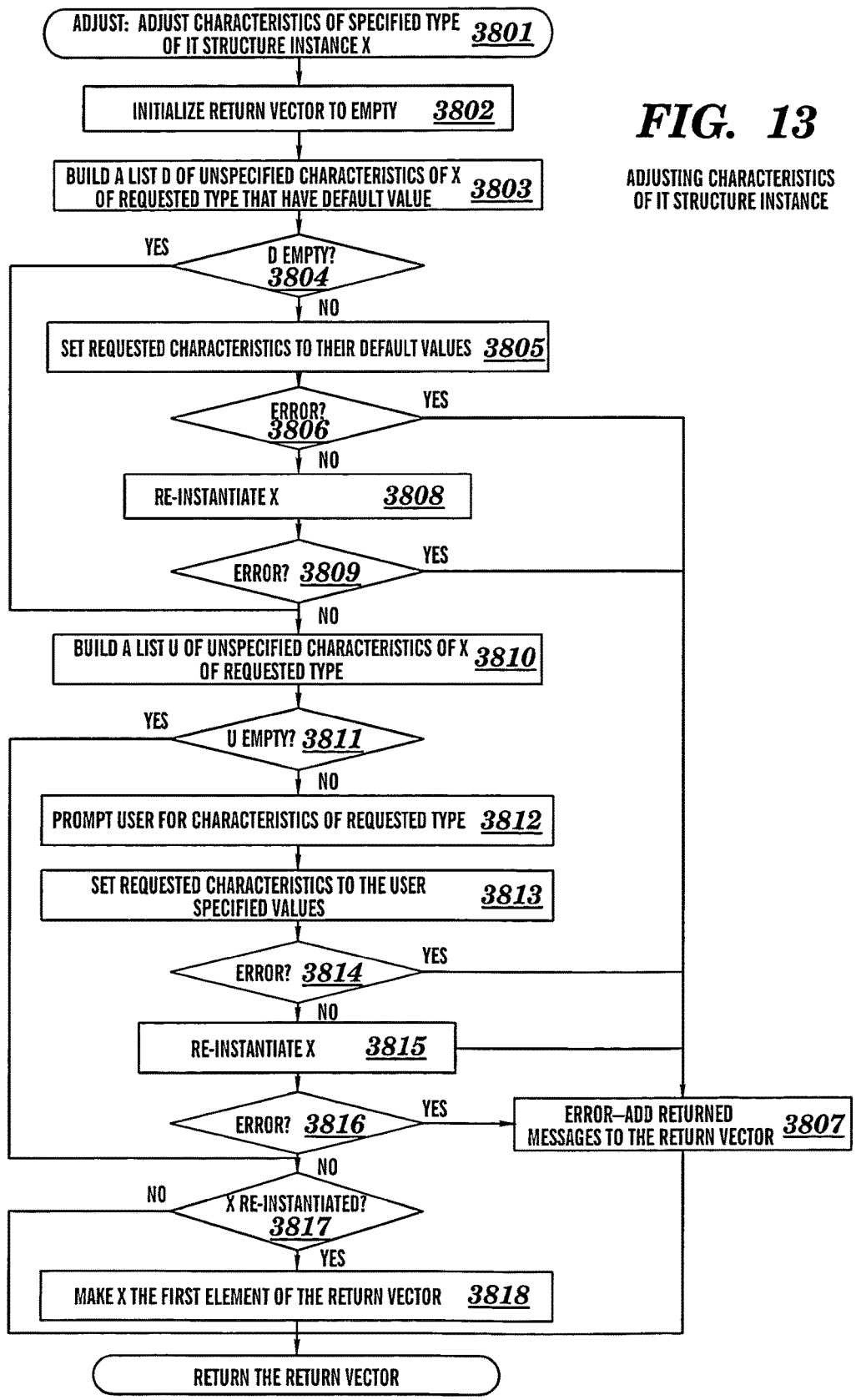
FIG. 13 is a flow chart depicting the process of adjusting a particular set of characteristics of an IT structure instance, in accordance with embodiments of the present invention.

FIG. 13 is a flow chart depicting the process of adjusting a particular set of characteristics of IT structure instance X 3801, in accordance with embodiments of the present invention. The process starts by initializing the return Vector to an empty Vector 3802. The process then builds a list D of unspecified characteristics of the requested type that have default values 3803. If D is not empty 3804 (i.e., at least one unspecified characteristic of the requested type has a default value), the unspecified characteristics are set to their default value 3805 using the appropriate method (i.e., setFunctions( ) for functional characteristics, setOperationalCharacteristics( ) for operational characteristics, and resolve( ) for resolution values). If an error occurs during the appropriate method invocations 3806 (i.e., if the requested characteristics could not be set to their corresponding default values), any error messages are added to the return Vector 3807 and processing terminates.

If default setting for the unspecified characteristics of the requested type was successful 3806, X is re-instantiated 3808. If an error occurs during the attempt to re-instantiate X 3809 (i.e., there is an internal logic error in X—X has accepted the default settings for the unspecified characteristics of the requested type, but now cannot be instantiated using these settings), any error messages are added to the return Vector 3807 and processing terminates.

The process then builds a list U of unspecified characteristics of the requested type 3810 (i.e., those that remain unspecified after any defaults were set). If U is not empty 3811 (i.e., at least one characteristic of the requested type remains unspecified), the process prompts the user for specification of the unspecified characteristics of the requested type 3812 and sets the now specified characteristic values using the appropriate method 3813. If an error occurs during the appropriate method invocations 3814 (i.e., if the requested characteristics could not be set to the values specified for them by the user), any error messages are added to the return Vector 3807 and processing terminates.

A number of possibilities exist as alternatives to addressing the user, comprising:
  consulting an internal policy, possibly, associated with the target IT delivery environment(s),
  generating a value for each unspecified characteristic of the requested type that would not violate internal logic of the class of IT structure X,
  ignoring the fact that a particular characteristic is unspecified,
  requiring the users to always provide a default value for all characteristics of IT structures.

If setting of the user-specified values for the unspecified characteristics of the requested type was successful 3814, X is re-instantiated 3815. If an error occurs during the attempt to re-instantiate X 3816 (i.e., there is an internal logic error in X—X has accepted the user settings for the unspecified characteristics of the requested type, but now cannot be instantiated using these settings), any error messages are added to the return Vector 3807 and processing terminates.

The process then checks whether X was re-instantiated during preceding steps 3817, and if so, makes the new instance of X the first element of the return Vector 3818, otherwise (no error has occurred, but X was not re-instantiated—this is a NOOP processing case), an empty (as originally created) return Vector is returned upon completion of the process.

FIG. 14 shows the process of selection a subclass of IT structure X, in accordance with embodiments of the present invention. The instances of IT structure X would support characteristics of the instance (abstract) of IT structure X, relationships imposed on the instance of IT structure X, dependencies of IT structure X, and be valid for the IT delivery environments to which the instance of IT structure X is targeted 3901. The process starts by initializing the return Vector to an empty Vector 3902. The process then finds all subclasses of the class C of X 3903 (i.e., those classes in the class library that inherit from C directly or indirectly (by inheriting from a class that inherits from C directly or indirectly)). If no subclasses of C are found 3904, an error is indicated 3905 and processing terminates. The reason for indicating an error is that X is abstract, and therefore must have a way to be translated to a virtual IT structure instance. The translation process ensures that X is fully specified, and therefore, no other means of reducing abstraction than finding a less abstract class for X remain— and that just proved to be impossible.

If at least one subclass of C was found 3904, the process iterates through the list of subclasses CL of C 3906. An instance Y of subclass CL is created 3907. If an error occurs when creating an instance of CL 3908, CL is ignored (although an error message may be stored in the return Vector, as inability to create an instance of CL indicates an error in CL definition) and the next value of CL is taken.

If instance Y of class CL was created successfully 3908, Y's IT dependencies are verified 3909. If an error is detected by verification of Y's IT dependencies 3910, CL is discarded and the next value of CL is taken.

The process then attempts to impose all characteristics of IT structure instance X on Y 3911. If any characteristics of X could not be imposed on Y and an error occurred 3912, CL is discarded and the next value of CL is taken.

If transfer of characteristics from X to Y was successful 3912, any IT relationships of X are imposed on Y 3913. If Y cannot support all of X's IT relationships 3914, CL is discarded and the next value of CL is taken.

If transfer of IT relationships from X to Y was successful 3914, Y is now verified against all IT delivery environments to which X is targeted 3915. If an error is indicated 3916, CL is discarded and the next value of CL is taken.

Now that Y supports the context of X, a check is performed to determine whether Y is abstract 3917. It is conceivable that Y was virtual from the beginning, or that one or a combination of the actions performed for the transfer of X's context to Y caused Y to become virtual. The reason this check was not performed before this point is that until it is known that Y can support the context of X, Y's type is irrelevant.

If Y is virtual 3917, it is added to the list of translation candidates D 3921, and the next value of CL is taken.

If Y is abstract 3917, a translation of Y is attempted 3918 (recursive invocation of the translation process). If an error occurs during translation of Y or if no error occurs but Y is not translated anyway (NOOP) 3919, CL is discarded and the next value of CL is taken.

If Y was successfully translated 3919, but the result of the translation is still an abstract IT structure 3920, CL is discarded and the next value of CL is taken.

Discarding a subclass of C that does not translate into a virtual IT structure is not a necessity but a design choice. It would be equally valid to include the abstract IT structure Y in the list of candidates D in hopes of subsequent user intervention and manual modification of class source of the class CL of Y such that translation of Y to a virtual IT structure becomes possible. The design choice may be made for conciseness and minimization of complicated actions by the user.

If Y is now virtual 3920, Y is added to the list of translation candidates D 3921 before the next CL value is taken, Upon completion of iteration through the subclasses CL of C, if the list of translation candidates D is empty 3922 (i.e., no translation candidates were found), an error is indicated 3905 and processing terminates.

If the list of translation candidates D contains at least one translation candidate 3922, the process of translation candidate selection is performed 3923, resulting in selection of a single translation result Y from the list of translation candidates D, which is made the first element of the return Vector 3924 prior to completion of the process.

FIG. 15 is a flow chart depicting the process of selecting the best translation candidate Y from a list of translation candidates D (all virtual) 30001, in accordance with embodiments of the present invention. The process starts by optimizing each element of D (using its optimize( ) method), and, if optimization is successful, replacing the element of D with the result of its optimization 30006. If the list of candidates D has a single element 30002, no further action is performed and the one element of D is returned.

If the list of translation candidates D has more than one element to choose from 30002, the prioritized list of optimization classes (getOptimizationFunctions( ) method) is retrieved 30003. The process then iterates through the list G of optimization classes 30004, always taking the next (i.e., the highest priority) optimization class F from the list 30005. The process then assesses each element of D using the assessment function A associated with the optimization class F 30007 and only keeps in D the elements for which A produces the best result 30008, discarding all others.

If more than one element remains in D 30009 (i.e., optimization resulted in equally good result for multiple elements of D), the process iterates to the next assessment function.

If after the application of a sequence of assessment functions, D only has a single element 30009, that element is returned as the one selected for translation from the list of candidates D.

If all assessment functions are exhausted before D is reduced to a single element 30004, the list of elements in D is presented to the user and the user's choice acts as the tie-breaker 30010—the user can select a single element from the list and the others will be discarded prior to the process completion.

Prompting the user for a tie-breaker decision is a design choice. Other designs are possible, including those in which other means of breaking the tie are employed (e.g., random choice), and those in which multiple elements of D are returned and, as a result, the user is presented with multiple equally valid translations. The reason for the choice of human intervention as the tie-breaker is the extremely low probability of having multiple applications of assessment functions to multiple different optimized IT structure instances produce identical results.

2.11 Binding

An IT structure instance X can be added to another IT structure Y by inclusion of X into the composition of Y by means of the addElement( ) method of Y. The process of addition of IT structure instance X to Y is called binding.

2.11.1 Delivery Binding

A virtual IT structure targeted to a particular IT delivery environment may be delivery-bound (i.e., translated into a delivery-bound virtual IT structure) by means of invoking the addElement( ) method of the target ITDeliveryEnvironment class instance.

2.12 Initiating Deployment of a Delivery-Bound IT Structure

Deployment of a delivery-bound IT structure is initiated by invoking the method deploy( ) of the particular ITDeliveryEnvironment class instance.

2.13 Fall-Back Policy

In several places above it has been noted that it is not always possible to transition from an abstract IT structure to, eventually, a real IT structure. A trivial cause of this may be unavailability of the appropriate materials in a provisioning system. More complex cases are possibly, in which, although materials are available, the right combination of them cannot be derived, or, worse, a wrong choice was made in a decision tree of one of the steps of translation to make delivery binding impossible. In many of these cases, returning to a previous step in the IT development process may resolve the problem. Therefore, a fall-back policy is implemented throughout the IT development process, such that, should a condition be reached preventing the production of a real IT structure as a result of a step of the IT development process, a return to the appropriate previous step of the IT development process is performed and a different decision is made, resulting hopefully in a positive outcome of the IT development process.

2.14 IT Agents

An IT agent is a program, installed on or embedded within OS of a computer, or embedded within microcode or hardware of a device, which gathers information about hardware configuration of a computer or a device, software installed on a computer, and network connectivity of a computer or a device, and transmits this information to a requester.

IT agents may transmit gathered information to a requester unsolicited or in response to a request. IT agents possess proper OS authorization and proper network connectivity to be able to transmit gathered information.

IT agents are a particular case of software agents in general, and therefore their implementation is OS- and possibly hardware-dependent.

External discovery functions other than agents may be used to obtain some or all of the required information.

Depending on the degree of sophistication of an IT agent, an IT agent may or may not be able to provide certain types of information—e.g., an IT agent may or may not contain logic permitting it to examine customization and configuration parameters of a particular program. For the purposes of this embodiment, it is assumed that an IT agent always possesses the degree of sophistication required to accomplish its task and furnish the information necessary to fulfill a particular function. If this is not the case, and some of the required information may not be provided by an IT agent, a manual completion step may be required in some of the methods described below, enabling the user to provide the missing information.

Depending on a security policy and network connectivity of a particular IT delivery environment, some IT agents may be unable to gain access to some of the information they intend to gather, or to transmit some of the gathered information. For the purposes of this embodiment, it is assumed that an IT agent always possesses the necessary authority to gather the information it needs and is capable of transmitting this information whenever such transmission is required. If this is not the case, and some of the required information may not be provided by an IT agent, a manual completion step may be required in some of the methods described below, enabling the user to provide the missing information.

IT agents are assumed to be present on all computers and smart devices comprising a real IT structure.

2.15 Reverse-Specifying an IT Structure

In order to accomplish some of the functions described below, it may be necessary to perform a process of delivery-binding "in reverse", having an operational configuration as input, and deriving from it a real and a virtual IT structure. The process relies on the information gathered by IT agents and builds a real IT structure first, including all IT entities within an IT structure being examined. Once a real IT structure is built, a corresponding virtual IT structure is produced by discarding the information imposed on an IT structure by the delivery binding process associated with a particular IT delivery environment, and replacing real primitive IT structures in an IT structure composition with their respective virtual primitive counterparts.

While the reverse-specification process will recreate composition and IT relationships of an IT structure, it will not produce IT dependencies or any methods beyond those present in the real or virtual primitive IT structures and IT relationships used to comprise the reverse-specification.

Figure 16:
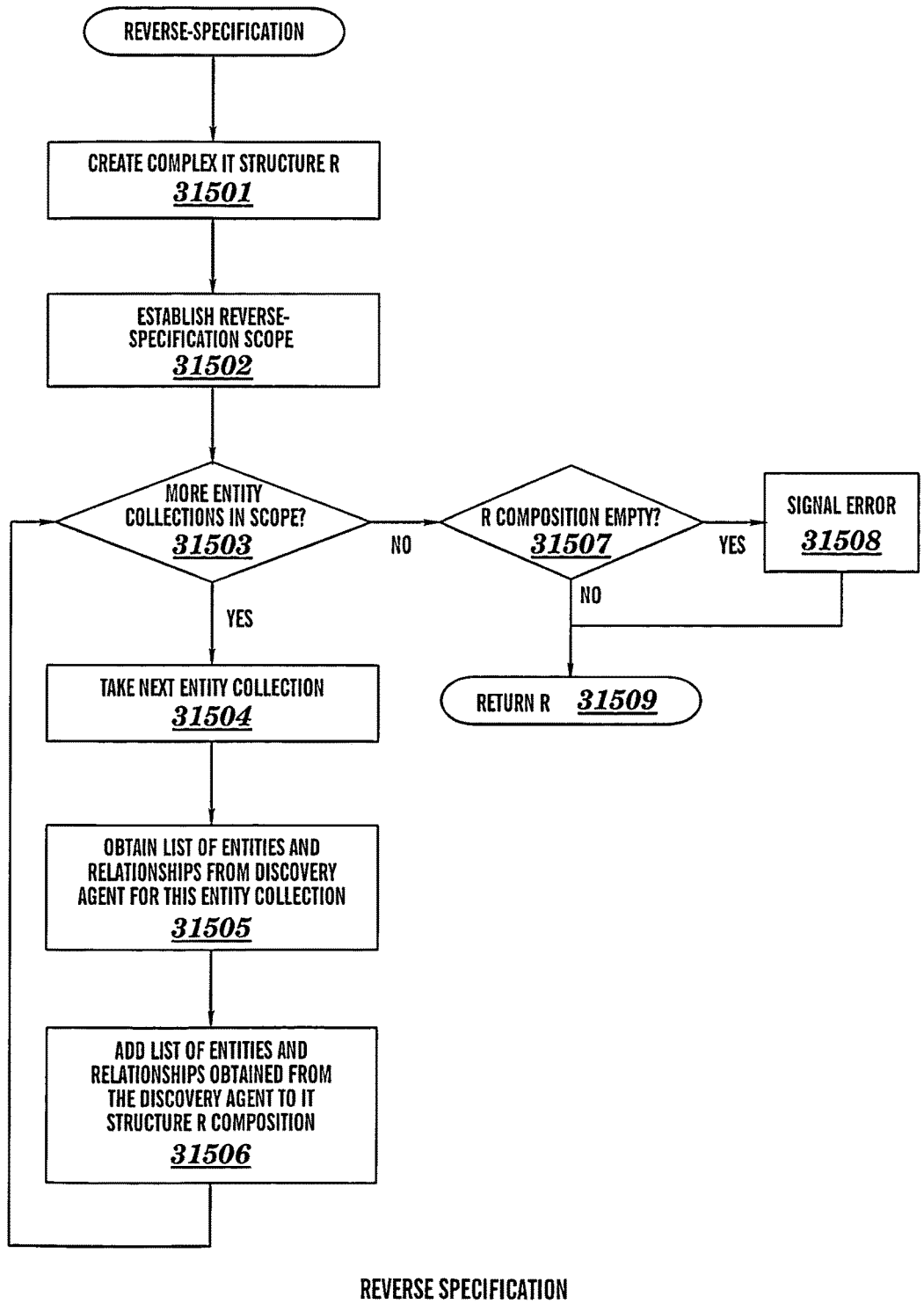
FIG. 16 is a flow chart depicting a reverse specification process, in accordance with embodiments of the present invention.

The process of reverse-specification is illustrated in FIG. 16, in accordance with embodiments of the present invention. The process starts by creating a complex IT structure R, with empty composition 31501. The process proceeds to establishing reverse-specification scope 31502. This is necessary to bound the reverse-specification process to the necessary subset of the IT delivery environment. The scope of reverse specification is a list of IT entities (most likely, computers) indicated by a user. If the scope is not provided, all IT entities supplied with agents are considered within the scope—e.g., the whole IT delivery environment. While there are unprocessed entity collections in scope (an entity collection is a group of IT entities reachable by a single discovery agent—e.g., a computer with its full software stack) 31503, consider the next unprocessed entity collection 31504. Obtain the list of entities and relationships from the associated discovery agent 31505, and add this list to the composition of IT structure R 31506. When all the entity collections are processed 31503, if composition of R is empty 31507, en error is indicated 31508. The resulting IT structure R is returned to the invoker 31509. The resulting IT structure R may result from either reverse specifying an IT delivery environment or from reverse specifying an IT system instance.

2.16 Comparing IT Structures

In some cases, it may be advantageous to compare two IT structures. IT structure classes can be compared by comparing their source code using conventional means of program comparison (e.g., delta-compare utility). The process of comparing two IT structure instances is described infra.

The process of comparing IT structures assumes one of the two cases, based on the usage of results of a comparison (these are the practical cases when a comparison would be useful—the method of comparison is not restricted to these situations):

1) The IT structure instances being compared are an original and its reverse-specification—for deployment verification and detection of unauthorized modifications.
2) The IT structure instances being compared are instances of the same IT structure subclass—for testing of IT structure methods by the user.

Figure 17:
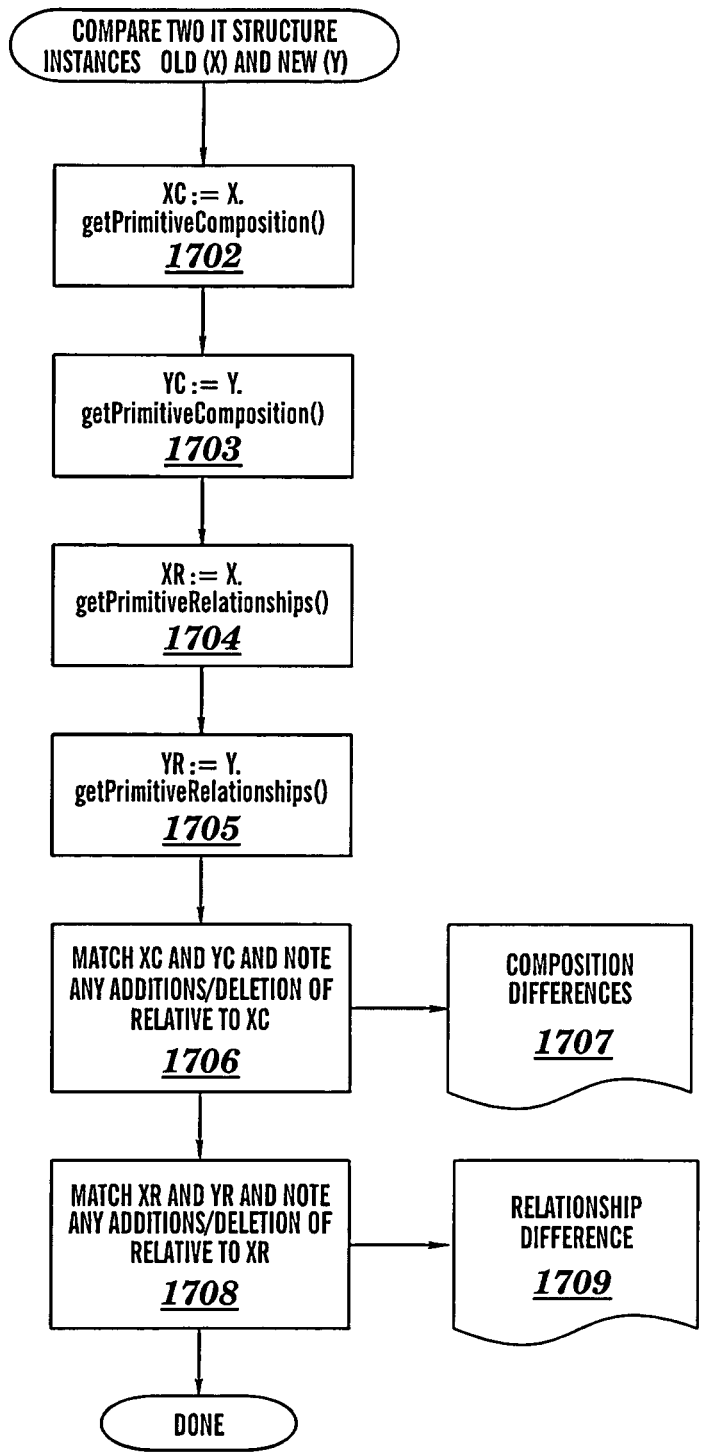
FIG. 17 is a flow chart depicting a process for comparing two IT structure instances, in accordance with embodiments of the present invention.

FIG. 17 describes the process of comparing two IT structure instances. The process obtains as input two IT structure instances, termed "old" (X) and "new" (Y) A1. The process obtains primitive compositions (getPrimitiveComposition( )) of the old 1702 and the new 1703 IT structure instances. The process then obtains primitive relationships list (getPrimitiveRelationships( )) of the old 1704 and the new IT 1705 structures.

The process then matches elements of the old and the new IT structure instances primitive compositions and determines any additions or deletions in (assumed) derivation of the new IT structure from the old 1706, and reports any additions or deletions in the new IT structure relative to the old one 1707.

The process then performs a similar matching for IT relationships of the old and the new IT structure instances 1708 and reports any differences 1709.

The process then produces a report (textual and/or graphical), showing any differences, and marking them as additions or deletions.

3.0 Computer System

FIG. 18 illustrates a computer system 90 used for implementing an IT Entity Model and associated processes including any subset of the algorithms and methods described supra, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes one or more algorithms for implementing an IT Entity Model and associated processes including any subset of the algorithms and methods described supra. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 18) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 18 shows the computer system 90 as a particular configuration of hardware and software, any configuration of hardware and software, as would be known to a person of ordinary skill in the art, may be utilized for the purposes stated supra in conjunction with the particular computer system 90 of FIG. 18. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer program product, comprising a computer readable storage device having computer readable program code stored therein, said program code containing instructions which, upon being executed by a processor of a computer system, implement a method for adding an Information Technology (IT) structure A to an IT structure X having a composition, said method comprising:

receiving a first list of all dependencies of elements in the composition of X;

after said receiving the first list, determining that no dependency of any element E in the composition of X in the first list of dependencies has an exclusion with a class Y to which A belongs;

receiving a second list of all dependencies of A;

after said receiving the second list, determining that no dependency of A in the second list of dependencies has an exclusion with a class Z to which an element E in the composition of X belongs;

after said determining that no dependency of any element E in the composition of X in the first list of dependencies has an exclusion with a class Y to which A belongs and after said determining that no dependency of A in the second list of dependencies has an exclusion with a class Z to which an element E in the composition of X belongs, ensuring that A's dependencies are satisfied followed by adding A to X, wherein said ensuring that A's dependencies are satisfied comprises:
creating an abstract structure instance satisfying one dependency of A's dependencies;
adding the abstract structure instance to the composition of X;
creating an abstract IT relationship between the abstract structure instance and A; and
adding the abstract IT relationship to X, wherein X is selected from the group consisting of a first abstract IT structure, a first virtual IT structure, and a first real IT structure, wherein A is selected from the group consisting of a second abstract IT structure, a second virtual IT structure, and a second real IT structure, wherein each abstract IT structure of the first abstract IT structure and the second abstract IT structure comprises at least one abstract IT entity, wherein each virtual IT structure of the first virtual IT structure and the second virtual IT structure comprises at least one virtual IT entity and does not comprise any abstract IT entity, wherein each real IT structure of the first real IT structure and the second real IT structure comprises at least one real IT entity and does not comprise any abstract IT entity and does not comprise any virtual IT entity, wherein each abstract IT entity of said at least one abstract IT entity and said any abstract IT entity comprises at least two undefined characteristics, wherein each virtual IT entity of said at least one virtual IT entity and said any virtual IT entity comprises one and only one undefined characteristic, wherein the first virtual IT structure and the second virtual IT structure are not delivery bound and cannot be deployed in an IT delivery environment, wherein each real IT entity of said at least one real IT entity does not comprise any undefined characteristic and can be deployed in the IT delivery environment.

2. The computer program product of claim 1, wherein prior to said receiving the first list and said receiving the second list, the method further comprises:
ascertaining that an unsatisfied dependency exists in X; and
providing A such that a subsequent addition of A to X will remove said unsatisfied dependency.

3. The computer program product of claim 1, wherein a composition of X comprises an IT structure B prior to adding A to X, and wherein after adding A to X the method further comprises establishing a relationship between A and B.

4. The computer program product of claim 3, wherein a composition of X comprises one or more interfaces prior to adding A to X, and wherein said establishing comprises establishing the relationship between A and B using at least one interface of said one or more interfaces.

5. The computer program product of claim 3, wherein the composition of X is a primitive composition of X.

6. The computer program product of claim 3, wherein the composition of X is not a primitive composition of X.

7. The computer program product of claim 1, wherein X is the first abstract IT structure and A is the second abstract IT structure.

8. The computer program product of claim 1, wherein X is the first abstract IT structure and A is the second virtual IT structure.

9. The computer program product of claim 1, wherein X is the first abstract IT structure and A is the second real IT structure.

10. The computer program product of claim 1, wherein X is the first virtual IT structure and A is the second abstract IT structure.

11. A computer system comprising a processor, a memory coupled to the processor, and a computer readable storage device coupled to the processor, said storage device containing program code which upon being executed by the processor via the memory implement a method for adding an Information Technology (IT) structure A to an IT structure X having a composition, said method comprising:
receiving a first list of all dependencies of elements in the composition of X;
after said receiving the first list, determining that no dependency of any element E in the composition of X in the first list of dependencies has an exclusion with a class Y to which A belongs;
receiving a second list of all dependencies of A;
after said receiving the second list, determining that no dependency of A in the second list of dependencies has an exclusion with a class Z to which an element E in the composition of X belongs;
after said determining that no dependency of any element E in the composition of X in the first list of dependencies has an exclusion with a class Y to which A belongs and after said determining that no dependency of A in the second list of dependencies has an exclusion with a class Z to which an element E in the composition of X belongs, ensuring that A's dependencies are satisfied followed by adding A to X, wherein said ensuring that A's dependencies are satisfied comprises:
creating an abstract structure instance satisfying one dependency of A's dependencies;
adding the abstract structure instance to the composition of X;
creating an abstract IT relationship between the abstract structure instance and A; and
adding the abstract IT relationship to X, wherein X is selected from the group consisting of a first abstract IT structure, a first virtual IT structure, and a first real IT structure, wherein A is selected from the group consisting of a second abstract IT structure, a second virtual IT structure, and a second real IT structure, wherein each abstract IT structure of the first abstract IT structure and the second abstract IT structure comprises at least one abstract IT entity, wherein each virtual IT structure of the first virtual IT structure and the second virtual IT structure comprises at least one virtual IT entity and does not comprise any abstract IT entity, wherein each real IT structure of the first real IT structure and the second real IT structure comprises at least one real IT entity and does not comprise any abstract IT entity and does not comprise any virtual IT entity, wherein each abstract IT entity of said at least one abstract IT entity and said any abstract IT entity comprises at least two undefined characteristics, wherein each virtual IT entity of said at least one virtual IT entity and said any virtual IT entity comprises one and only one undefined characteristic, wherein the first virtual IT structure and the second virtual IT structure are not delivery bound and cannot be deployed in an IT delivery environment, wherein each real IT entity of said at least one real IT entity does not comprise any undefined characteristic and can be deployed in the IT delivery environment.

12. The computer system of claim 11, wherein prior to said receiving the first list and said receiving the second list, the method further comprises:

ascertaining that an unsatisfied dependency exists in X; and providing A such that a subsequent addition of A to X will remove said unsatisfied dependency.

13. The computer system of claim 11, wherein a composition of X comprises an IT structure B prior to adding A to X, and wherein after adding A to X the method further comprises establishing a relationship between A and B.

14. The computer system of claim 13, wherein a composition of X comprises one or more interfaces prior to adding A to X, and wherein said establishing comprises establishing the relationship between A and B using at least one interface of said one or more interfaces.

15. The computer system of claim 13, wherein the composition of X is a primitive composition of X.

16. The computer system of claim 13, wherein the composition of X is not a primitive composition of X.

17. The computer system of claim 11, wherein X is the first abstract IT structure and A is the second abstract IT structure.

18. The computer system of claim 11, wherein X is the first abstract IT structure and A is the second virtual IT structure.

19. The computer system of claim 11, wherein X is the first abstract IT structure and A is the second real IT structure.

20. The computer system of claim 11, wherein X is the first virtual IT structure and A is the second abstract IT structure.

* * * * *